United States Patent
Fernandez Blanco et al.

(10) Patent No.: US 11,965,688 B2
(45) Date of Patent: Apr. 23, 2024

(54) NESTED COOLING ARRANGEMENTS FOR REFRIGERATED TRANSPORT

(71) Applicant: THERMO KING LLC, Minneapolis, MN (US)

(72) Inventors: Inaki Fernandez Blanco, Barcelona (ES); Santiago Martinez Ballester, Palleja (ES); Joan Vila Soler, Terrassa (ES)

(73) Assignee: THEMRO KING LLC, Minneapolis, MN (US)

( * ) Notice: Subject to any disclaimer, the term of this patent is extended or adjusted under 35 U.S.C. 154(b) by 44 days.

(21) Appl. No.: 17/646,957

(22) Filed: Jan. 4, 2022

(65) Prior Publication Data
US 2022/0214094 A1  Jul. 7, 2022

(30) Foreign Application Priority Data
Jan. 5, 2021  (EP) ................................... 21382001

(51) Int. Cl.
*F25D 11/00* (2006.01)
*F25B 13/00* (2006.01)

(52) U.S. Cl.
CPC ............ *F25D 11/003* (2013.01); *F25B 13/00* (2013.01)

(58) Field of Classification Search
CPC .......... F25D 11/003; F25B 7/00; F25B 13/00
See application file for complete search history.

(56) References Cited

U.S. PATENT DOCUMENTS

| | | | |
|---|---|---|---|
| 2009/0266100 A1 | 10/2009 | Viegas | |
| 2018/0023876 A1 | 1/2018 | Muller et al. | |
| 2018/0328643 A1* | 11/2018 | Eddy | .................... F25D 19/003 |

FOREIGN PATENT DOCUMENTS

| | | | |
|---|---|---|---|
| DE | 20215519 | | 4/2003 |
| DE | 102008047753 | | 3/2010 |
| EP | 1408296 | | 4/2004 |
| JP | 2002-206838 | | 7/2002 |
| JP | 2003314938 A | * | 11/2003 |
| WO | 2005/040699 | | 5/2005 |

OTHER PUBLICATIONS

Translation JP-2003314938-A.*
Extended European Search Report, issued in the corresponding EP patent application No. 21382001.2, dated Oct. 13, 2021, 15 pages.

* cited by examiner

*Primary Examiner* — Elizabeth J Martin
(74) *Attorney, Agent, or Firm* — HSML P.C.

(57) ABSTRACT

There is disclosed a transport refrigeration unit comprising an enclosed cargo space, an outer refrigeration cycle configured to transfer heat from the cargo space exteriorly of the cargo space, to cool the cargo space; a container installed within the cargo space; and an inner refrigeration cycle configured to transfer heat from an interior of the container, to cool the interior of the container. There is also disclosed a portable refrigeration device for use in such nested cooling arrangements, methods of adapting a transport refrigeration unit and/or portable refrigeration device for such use, a refrigeration module for such use, and an associated method of operating a transport refrigeration unit.

14 Claims, 5 Drawing Sheets

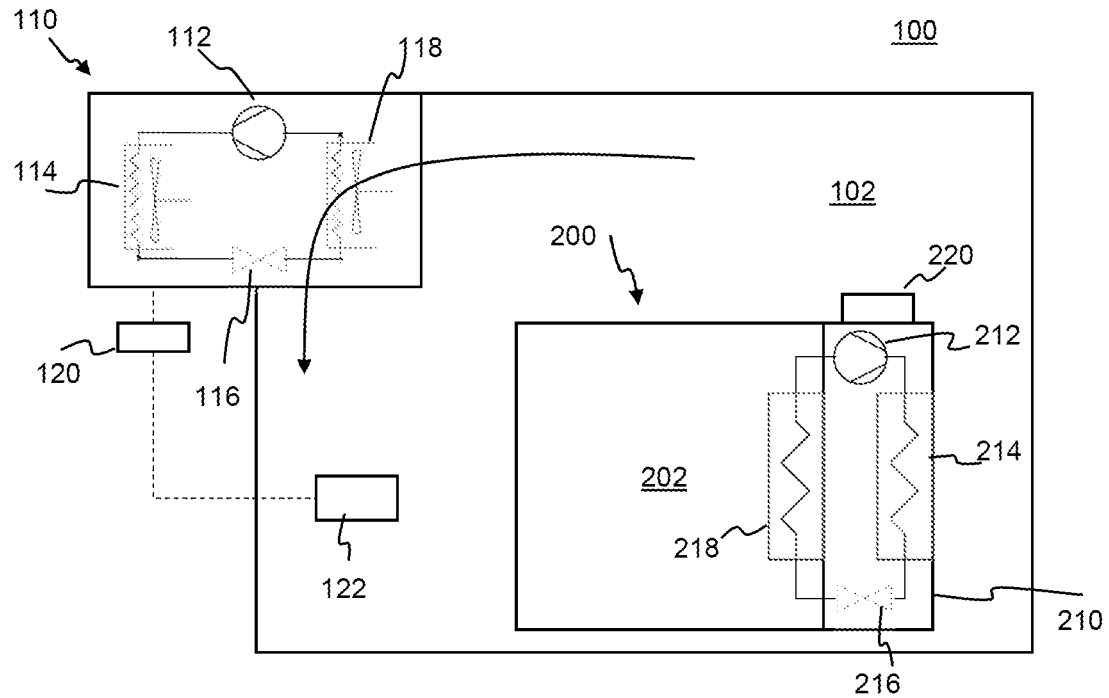
Figure 1
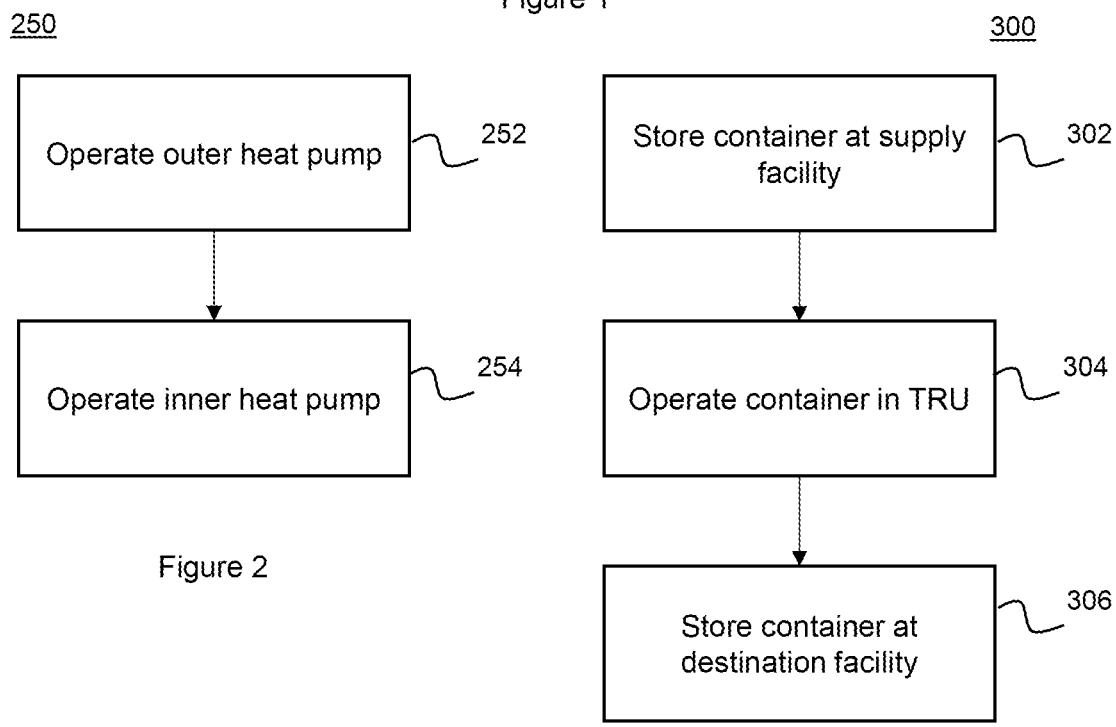
Figure 2
Figure 3

NESTED COOLING ARRANGEMENTS FOR REFRIGERATED TRANSPORT

FIELD

The invention relates to nested cooling arrangements for refrigerated transport, and in particular to a transport refrigeration unit, a portable refrigeration device, methods of use and retrofitting for nested cooling arrangements.

BACKGROUND

Transport refrigeration units (TRUs) such as refrigerated trucks, trailers (for use in a tractor-trailer combination), reefers and the like are used to transport perishable goods at chilled conditions (e.g. 0-5° C.) and/or at frozen conditions (e.g. −20° C.).

The COVID-19 pandemic and a selection of the vaccines developed in response to it present a need to provide means to distribute goods at very low temperatures (e.g. at or below −50° C., for example at or below −70° C.), and at vast scale.

SUMMARY

According to a first aspect there is disclosed a transport refrigeration unit comprising:
  an enclosed cargo space;
  an outer refrigeration cycle configured to transfer heat from the cargo space exteriorly of the cargo space, to cool the cargo space;
  a container installed within the cargo space;
  an inner refrigeration cycle configured to transfer heat from an interior of the container, to cool the interior of the container.

A controller of the outer refrigeration cycle may be configured to maintain a target temperature in the cargo space of no more than −5° C., or no more than −15° C., for example a target temperature of between −25° C. and −5° C., or between −20° C. and −10° C., such as −15° C.

When the inner refrigeration cycle is configured to transfer heat from the interior of the container exteriorly of the cargo space, for example by a cascade refrigeration cycle, the controller of the outer refrigeration cycle may be configured to maintain a target temperature in the cargo space, for example a temperature of no more than 5° C., for example 0-5° C.

The inner refrigeration cycle may form a second stage cycle of a cascade refrigeration cycle. The transport refrigeration unit may comprise a first stage cycle of the cascade refrigeration cycle which is configured to reject heat exteriorly of the cargo space. An inter-stage heat exchanger may be provided between the first stage cycle and the second stage cycle.

The inter-stage heat exchanger may serve as a condenser heat exchanger in the second stage cycle and may serve as an evaporator heat exchanger in the first stage cycle.

The outer refrigeration cycle and the first stage cycle of the cascade refrigeration cycle may be in parallel relationship, extending through a common condenser heat exchanger for rejecting heat exteriorly of the cargo space, and optionally extending through a common compressor. Alternatively, the outer refrigeration cycle may comprise the first stage cycle so that an evaporator heat exchanger of the outer refrigeration cycle for cooling the cargo space is in series relationship with an evaporator side of the inter-stage heat exchanger.

In other words, there may be a heat pump or refrigeration equipment configured as a heat pump or refrigeration cycle, having a dual-evaporator configuration for both (i) providing cooling to the cargo space and (ii) receiving heat from the second stage cycle at the inter-stage heat exchanger of the cascade refrigeration cycle.

The refrigeration equipment may have a parallel arrangement defining both the outer refrigeration cycle and the first stage cycle of the cascade refrigeration cycle in parallel so that there is common refrigeration equipment between the cycles (i.e. refrigeration equipment which is in common between the outer refrigeration cycle and the first stage cycle). For example: a compressor and a condenser heat exchanger may be in common between the outer refrigeration cycle and the first stage cycle. It may be that the outer refrigeration cycle and the first stage cycle each have a dedicated expansion device, distributor line, and evaporator heat exchanger (as noted above). The expansion devices may be individually controllable in order to control thermodynamic conditions in the respective cycles. There may be a common expansion device between the outer refrigeration cycle and the first stage cycle.

When the outer refrigeration cycle and the first stage cycle of the cascade refrigeration cycle are in parallel relationship, the outer refrigeration cycle and the first stage cycle may separate from one another upstream of respective evaporator heat exchangers and may join together downstream of the respective evaporator heat exchangers, The terms upstream and downstream refer to the direction of refrigerant flow in cooling modes of the respective cycles (i.e. when they are operated to transfer heat from the cargo space and from the second stage cycle respectively, and reject the heat exteriorly of the cargo space.

Alternatively, the refrigeration equipment may have a series arrangement (e.g. a single refrigeration cycle) in which an evaporator heat exchanger for cooling the cargo space is in series with an evaporator side of the inter-stage heat exchanger, such that the outer refrigeration cycle comprises (or acts as) the first stage cycle of the cascade refrigeration cycle, receiving heat from a second stage cycle at the inter-stage heat exchanger.

It may be that the inter-stage heat exchanger of the cascade refrigeration cycle is supported by the container. Alternatively, the inter-stage heat exchanger may be supported on a support of a refrigeration module of the transport refrigeration unit.

There may be releasable connections with shut-off valves between the inter-stage heat exchanger and (i) a distributor line of the first stage cycle extending to the inter-stage heat exchanger and (ii) a suction line of the first stage cycle extending from the inter-stage heat exchanger, whereby the container, the second stage cycle and the inter-stage heat exchanger are removable from the transport refrigeration unit as a portable sub-system; and/or releasable connections with shut-off valves between the inter-stage heat exchanger and (i) a discharge line of the second stage cycle extending to the inter-stage heat exchanger and (ii) a liquid line of the second stage cycle extending from the inter-stage heat exchanger, whereby the container and the second stage cycle are removable from the transport refrigeration unit as a portable sub-system.

It may be that a condenser heat exchanger of the inner refrigeration cycle is configured to reject heat exteriorly of the container into the cargo space. There may be no refrigerant lines extending through the cargo space to the container.

The transport refrigeration unit may comprise a controller configured to operate the inner refrigeration cycle to maintain one or more thermodynamic conditions including:
- a target interior temperature of the container of −70° C. or less, for example between −85° C. and −70° C.; and/or
- a target evaporator saturation temperature of −70° C. or less, for example between −90° C. and −70° C.

The controller may be configured to operate the inner refrigeration cycle to maintain a thermodynamic condition that a target condenser saturation temperature is −25° C. or more, for example between −25° C. and −5° C., such as −10° C. The target condenser saturation temperature may correspond to a temperature higher than a temperature of a heat sink, which may be air within the cargo space in which the container is disposed, or the temperature of the first stage cycle refrigerant at the inter-stage heat exchanger.

The controller may be configured to: determine an inner evaporator pressure parameter associated with a pressure of refrigerant at a location between an expansion device and a compressor of the inner refrigeration cycle; and operate the inner refrigeration cycle at least partly based on the inner evaporator pressure parameter and a predetermined relationship between the inner evaporator pressure parameter and a saturation temperature for a selected refrigerant. The controller may store information defining the predetermined relationship, and the selected refrigerant may be a low temperature refrigerant having a triple point at less than −70° C., and optionally a saturation temperature of −70° C. or less at a pressure of 50 kPa, for example a refrigerant selected from the group consisting of R-23, R-469A, R-508B, R-290 and R-170.

For example, the controller may operate the inner refrigeration cycle to maintain a target superheat in a suction line of the inner refrigeration cycle for entry into the compressor (e.g. 2-6° C. of superheat), and may also operate the inner refrigeration cycle to maintain a target evaporator saturation temperature or a target interior temperature of the container. The controller may determine an inner evaporator pressure parameter (e.g. corresponding to a pressure in a distributor line or suction line of the inner refrigeration cycle, or at the evaporator heat exchanger) to determine an evaporator saturation temperature. The controller may determine a temperature parameter (e.g. corresponding to a temperature in the suction line of the inner refrigeration cycle, or at a discharge of the evaporator heat exchanger, or at an entry to a compressor of the inner refrigeration cycle). A superheat may be determined based on the temperature parameter and the respective evaporator saturation temperature. The controller may be coupled to sensor equipment to determine the respective parameters, for example a pressure sensor and/or a temperature sensor.

It may be that a maximum cooling capacity of the inner refrigeration cycle is less than a heat transfer rate into the container (i.e. through its walls) when the container is disposed in nested refrigeration conditions (i.e. with the container disposed in a refrigerated environment), but may be greater than a heat transfer rate into the container when the container is disposed in control conditions.

The container and the inner refrigeration cycle may be configured so that when the inner refrigeration cycle is:
- charged with a low temperature refrigerant having a triple point at −70° C. or less, optionally with a saturation temperature of −70° C. or less at 50 kPa;
- operated to maintain one or more of the above thermodynamic conditions; and
- operated to maintain a compressor discharge temperature at or below a threshold of no more than 150° C., no more than 140° C., or no more than 135° C.;
- a maximum cooling capacity (in W) of the inner refrigeration cycle is less than a heat transfer rate (in W) through the container to its interior in control conditions comprising:
- the container being disposed in air at a control temperature, resting on a surface at the control temperature, the control temperature being 10° C., and;
- the interior of the container being maintained at −70° C.

The control temperature may be 10° C. In the controlled conditions the air may be absent of forced convection (i.e. the air may not be caused to move by a fan or the like), such that only natural convection currents arise.

The container and the inner refrigeration cycle may be configured so that a heat transfer rate (in W) through the container to its interior in nested refrigeration conditions is equal to or less than the maximum cooling capacity defined above, the nested refrigeration conditions comprising:
- the container being disposed in air at a refrigeration setpoint temperature, resting on a surface at the refrigeration setpoint temperature, and;
- the interior of the container being maintained at −70° C. or at a temperature corresponding to the controller maintaining the one or more thermodynamic conditions specified above.

The refrigeration setpoint temperature may be 5° or less. The refrigeration setpoint temperature may be −5° C. or less, −15° or less, for example −25° C. to 5° C., or −25° C. to −5° C., or −25° C. to −15° C.

It may be that the inner refrigeration cycle is charged with a low temperature refrigerant having a triple point at −70° C. or less, optionally having a saturation temperature of −70° C. or less at a pressure of 50 kPa.

The inner refrigeration cycle may have a maximum compression ratio of no more than 30, for example no more than 20. The maximum compression ratio limit may be due to the configuration of the compressor of the inner refrigeration cycle (which may be a single compressor of the inner refrigeration cycle), or there may be pressure control equipment for the inner refrigeration cycle that is configured so that the inner refrigeration cycle is operated at a maximum compression ratio of no more than 30, for example no more than 20.

The pressure control equipment for the inner refrigeration cycle may comprise a controller which is configured to operate the inner refrigeration cycle so that in use the maximum compression ratio in the inner refrigeration cycle is no more than 30, for example no more than 20.

The inner refrigeration cycle may be integrated with the container to provide a portable refrigeration device, wherein the portable refrigeration device is optionally removable from the cargo space.

According to a second aspect there is disclosed a method of adapting a transport refrigeration unit and a portable refrigeration device, comprising:
- providing a transport refrigeration unit comprising a refrigeration module defining an outer refrigeration cycle configured to transfer heat from an enclosed cargo space of the transport refrigeration unit exteriorly of the cargo space to cool the cargo space;
- providing a portable refrigeration device to be installed in the cargo space, the portable refrigeration device comprising:
  - a container;

an inner refrigeration cycle configured to transfer heat from an interior of the container exteriorly of the container;

charging the portable refrigeration device with a low temperature refrigerant having a triple point at −70° or less, optionally having a saturation temperature of −70° C. or less at a pressure of 50 kPa;

configuring a controller of the portable refrigeration device to operate the inner refrigeration cycle to maintain one or more thermodynamic conditions including a target interior temperature of the container of −70° C. or less, for example between −85° C. and −70° C.; and/or a target evaporator saturation temperature of −70° C. or less, for example between −90° C. and −70° C.;

installing the portable refrigeration device in the cargo space of the transport refrigeration unit.

The method may comprise configuring a controller of the outer refrigeration cycle to maintain a target temperature in the cargo space of no more than 5° C., no more than −5° C., or no more than −15° C., for example a target temperature of between −25° C. and 5° C., between −25° C. and −5° C., or between −25° C. and −5° C., such as −15° C.

It may be that a temperature of the above ranges, the controller is configured to maintain a target temperature of no more than −5° C. when the inner refrigeration cycle is to reject heat into the cargo space, and may be configured to maintain a target temperature greater than −5° C. when the inner refrigeration cycle is to transfer heat from the interior of the container exteriorly of the cargo space, for example by a cascade refrigeration cycle (e.g. a cascade refrigeration cycle in which the inner refrigeration cycle is a second stage cycle and in which there is a first stage cycle that receives heat from the second stage cycle and transfers it exteriorly of the cargo space).

According to a third aspect there is provided a method of adapting a portable refrigeration device, comprising:

providing a portable refrigeration device to be installed in a cargo space of a transport refrigeration unit, the portable refrigeration device comprising:

a container;

an inner refrigeration cycle configured to transfer heat from an interior of the container exteriorly of the container;

charging the inner refrigeration cycle with a low temperature refrigerant having a triple point at −70° C. or less, optionally having a saturation temperature of −70° C. or less at a pressure of 50 kPa; and configuring a controller of the portable refrigeration device to operate the inner refrigeration cycle to maintain one or more thermodynamic conditions including:

a target interior temperature of the container of −70° C. or less, for example between −85° C. and −70° C.; and/or a target evaporator saturation temperature of −70° C. or less, for example between −90° C. and −70° C.

A method according to the second and/or third aspect may further comprise configuring the controller of the portable refrigeration device to operate the inner refrigeration cycle to maintain a thermodynamic condition that a target condenser saturation temperature is −25° C. or more, for example between −25° C. and 0° C., such as −10° C.

The method (i.e. according to the second and/or third aspect) may further comprise discharging from the inner pump cycle a refrigerant having a saturation temperature of more than −70° C. at a pressure of 50 kPA, prior to charging the inner refrigeration cycle with the low temperature refrigerant.

The method may further comprise: removing a condenser heat exchanger of the portable refrigeration device configured to discharge heat exteriorly of the container; and replacing or bypassing the condenser heat exchanger with an inter-stage heat exchanger connected to or configured to connect to a distributor line and a suction line of a first stage cycle of a cascade refrigeration cycle, such that the inner refrigeration cycle is configured to operate as a second stage cycle of the cascade refrigeration cycle which rejects heat to the first stage cycle at the inter-stage heat exchanger.

The inter-stage heat exchanger may be supported on the container, or may be provided remote from the container and fluidically coupled to components of the inner refrigeration cycle via a discharge line and a liquid line of the inner refrigeration cycle.

In a method as described above and in accordance with the second aspect, the method may further comprise providing a first stage cycle in the refrigeration module of the transport refrigeration unit and coupling it to the inner refrigeration cycle of the portable refrigeration device to provide a cascade refrigeration cycle with an inter-stage heat exchanger therebetween.

The first stage cycle may be provided by adapting the refrigeration module of the transport refrigeration so that: (i) the outer refrigeration cycle and the first stage cycle are in parallel relationship extending through a common condenser heat exchanger of the refrigeration module for rejecting heat exteriorly of the cargo space and optionally extending through a common compressor; or (ii) the outer refrigeration cycle comprises the first stage cycle so that an evaporator heat exchanger of the outer refrigeration cycle for cooling the cargo space is in series relationship with an evaporator side of the inter-stage heat exchanger.

The refrigeration module as provided may comprise primary and secondary evaporator heat exchangers for cooling the cargo space or respective cargo spaces. The method may comprise replacing the secondary evaporator heat exchanger with the inter-stage heat exchanger to provide the first stage cycle; or providing the inter-stage heat exchanger to by-pass the secondary evaporator heat exchanger.

Valves may be provided to by-pass the secondary evaporator heat exchanger so that refrigerant can selectively flow either to the secondary evaporator heat exchanger and not to the inter-stage heat exchanger, or to the inter-stage heat exchanger and not to the secondary evaporator heat exchanger. A first valve or valves may be disposed upstream of the secondary evaporator heat exchanger between the respective expansion device and the secondary evaporator heat exchanger. A second valve or valves may be disposed downstream of the secondary evaporator heat exchanger between the secondary evaporator heat exchanger and the compressor. The first valve(s) and/or second valve(s) may be three-way valves.

As provided in the refrigeration module, the secondary evaporator heat exchanger may be an evaporator coil configured to transfer heat from a gas passing over the evaporator coil to a refrigerant flowing through it.

The transport refrigeration unit as provided may comprise primary and secondary enclosed cargo spaces and the refrigeration module may be operable to maintain different temperatures in the primary and secondary enclosed spaces using the primary and secondary evaporator heat exchangers respectively. The method may further comprise:

removing a partition between the enclosed spaces; and/or locating the inter-stage heat exchanger remote from a housing or support for the secondary evaporator heat exchanger, optionally so that the inter-stage heat exchanger is supported by the container of the portable refrigeration device; or locating the inter-stage heat exchanger in association with a housing or support for the secondary evaporator heat exchanger and fluidically coupling the inner refrigeration cycle with the inter-stage heat exchanger.

According to a fourth aspect there is disclosed a kit for adapting a transport refrigeration unit comprising an enclosed cargo space and a refrigeration module to cool the cargo space, the kit comprising:

a container to be installed in the cargo space;

an inter-stage heat exchanger for a cascade refrigeration cycle having a first stage cycle and a second stage cycle;

second stage cycle equipment connected to or configured to connect to the inter-stage heat exchanger to define a second stage cycle of the cascade refrigeration cycle, the second stage cycle being configured to transfer heat from an interior of the container to the first stage cycle via the inter-stage heat exchanger;

optionally comprising first stage cycle equipment for connecting the refrigeration module of the transport refrigeration unit to the inter-stage heat exchanger to define a first stage cycle of the cascade refrigeration cycle, the first stage cycle equipment comprising: a first stage distributor line; and a first stage suction line.

The inter-stage heat exchanger is supported on the container as described above. The kit may further comprise the releasable connections as described above at respective locations. The kit may further comprise a controller to operate the second stage cycle as described above with respect to the controller of the first aspect that is configured to operate the inner refrigeration cycle.

The kit may comprise the pressure control equipment as described above with reference to the first aspect. The kit may comprise any feature of the container, inter-stage heat exchanger, inner refrigeration cycle and related equipment described above with respect to the first aspect of the invention. The container may be a portable refrigeration device integrally comprising the second stage cycle equipment.

The second stage cycle (in other words, the second stage cycle equipment which defines the second stage cycle) may be charged with a low temperature refrigerant having a triple point at −70° C. or less, optionally having a saturation temperature of −70° C. or less at a pressure of 50 kPa.

According to a fifth aspect there is disclosed a method of modifying a refrigeration module for a transport refrigeration unit, the refrigeration module comprising primary and secondary evaporator heat exchangers for cooling one or more enclosed cargo spaces, the method comprising:

replacing or bypassing the secondary evaporator heat exchanger with an inter-stage heat exchanger for a cascade refrigeration cycle, so that the refrigeration module provides a first stage cycle for the cascade refrigeration cycle;

wherein the inter-stage heat exchanger is configured to connect to second stage cycle equipment to define a second stage cycle of the cascade refrigeration cycle, the inter-stage heat exchanger comprising connections for a discharge line and a liquid line of the second stage cycle equipment.

The inter-stage heat exchanger may be provided with releasable connections with shut-off valves as described elsewhere herein.

According to a sixth aspect there is disclosed a refrigeration module for a transport refrigeration unit, the refrigeration module comprising at least one refrigeration cycle, the at least one refrigeration cycle comprising:

a primary evaporator heat exchanger configured to cool an enclosed space, for example a cargo space of the transport refrigeration unit;

an inter-stage heat exchanger configured so that a refrigeration cycle of the refrigeration module provides a first stage cycle for a cascade refrigeration cycle;

wherein the inter-stage heat exchanger is configured to connect to second stage cycle equipment to define a second stage cycle of the cascade refrigeration cycle, the inter-stage heat exchanger comprising connections for a discharge line and a liquid line of the second stage cycle equipment.

According to a seventh aspect, there is disclosed a method of operating a transport refrigeration unit comprising:

operating an outer refrigeration cycle to transfer heat from an enclosed cargo space exteriorly of the enclosed cargo space, to maintain a target temperature associated with the cargo space;

operating an inner refrigeration cycle to transfer heat from an interior of a container installed within the cargo space;

wherein the inner refrigeration cycle is operated to maintain thermodynamic conditions including:

a target interior temperature of the container of −70° C. or less, for example between −85° C. and −70° C.; and/or a target evaporator saturation temperature of −70° C. or less, for example between −90° C. and −70° C.

The target temperature associated with the cargo space may be a target temperature at a sensor location within the cargo space, or at a sensor location corresponding to air returning to an evaporator of the outer refrigeration cycle ("return air") or air being supplied by an evaporator of the outer refrigeration cycle ("supply air"). The target temperature may be 5° C. or less, for example −5° C. or less, −15° C. or less, for example between −25° C. and 5°, or between −25° C. and −5° C., or between 25° C. and −15° C.

The transport refrigeration unit may be in accordance with the first aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF DRAWINGS

The invention will now be described, by way of example only, with reference to the accompanying drawings, in which:

FIG. 1 is a schematic cross-sectional view of a transport refrigeration unit including an installed refrigerated container;

FIG. 2 is a flow diagram of a method of operating a transport refrigeration unit;

FIG. 3 is a flow diagram of a refrigerated transport method;

DETAILED DESCRIPTION

Figure 4:
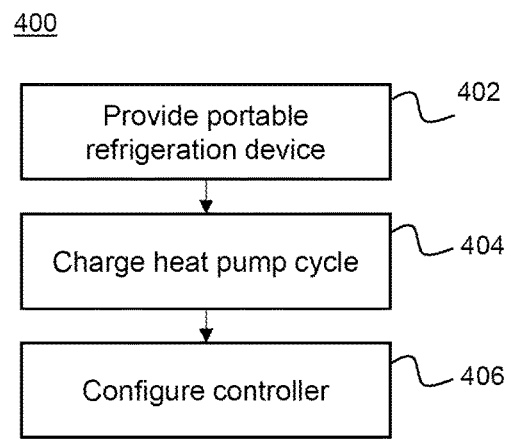
FIG. 4 is a flow diagram of a method of adapting a portable refrigeration device.

FIG. 1 schematically shows a transport refrigeration unit (TRU) 100, which in this example is a refrigerated truck. For simplicity, a chassis and cab are not shown. The disclosure applies to transport refrigeration units of all types, for example trucks (e.g. box trucks), vans, trailers for use in a tractor-trailer combination (e.g. for an artic), refrigerated intermodal containers (reefers) and the like.

The TRU 100 comprises an enclosed cargo space 102 and a refrigeration module 110 to cool the cargo space 102. The refrigeration module 110 may be a reversible refrigeration module, but for the purposes of this disclosure it is only relevant to discuss a cooling mode and/or cooling configuration of the refrigeration module 110. In this example the refrigeration module 110 defines a refrigeration cycle (in particular a vapor compression cycle) and comprises, in flow order for cooling, a compressor 112, a condenser 114 for rejecting heat to external air, an expansion device 116, and an evaporator 118 for transferring heat from a controlled environment within the enclosed cargo space 102. The expansion device may be a TXV (thermal expansion valve) or EXV (electronic expansion valve) as is known in the art. The refrigeration cycle may be a single stage vapor compression cycle (i.e. having a single compression of a single refrigerant between evaporation and condensation, typically effected by a single compressor or single set of compressors between an evaporator heat exchanger and a condenser heat exchanger). The refrigeration cycle may be charged with a refrigerant having a triple point of −30° C. or less, and which may have a saturation temperature of more than −70° C. at 50 kPa. The refrigerant may have a critical temperature of 25° C. or more. A suitable refrigerant may be R-452A, R-134a, or R-404A.

This disclosure makes use of standard terminology of refrigeration cycle components as referenced above, and for refrigerant lines extending between components of a refrigeration cycle, including: a "discharge line" extending from a compressor to a condenser; a "liquid line" extending from a condenser to an expansion device; "distributor line" extending from an expansion device to an evaporator, and "suction line" extending from an evaporator to a compressor. Further, the present disclosure envisages that any air-to-refrigerant exchanger disclosed herein (i.e. any heat evaporator or condenser heat exchanger other than an inter-stage heat exchanger of a cascade refrigeration cycle) may be provided with a fan, which may be controllable to vary speed, duty or whether it is off or on. Control of a fan may be used to vary a rate of heat transfer at the respective heat exchanger.

The refrigeration module 110 further comprises a controller 120, functions of which will be described in further detail below.

The TRU 100 further comprises a refrigerated container 200 removably installed within the cargo space 102, the container 200 comprising a refrigeration module 210 and an interior 202 which is to be cooled by the refrigeration module 210.

In this particular example the refrigerated container 200 is in the form of a portable refrigeration device in which the refrigeration module 210 is integrated with the container (i.e. as a unitary system provided by an original equipment manufacturer (OEM)), but in other examples a container may be adapted to add a refrigeration module or other apparatus for defining a refrigeration cycle, as will be described elsewhere herein.

The refrigeration module 210 defines a refrigeration cycle (in particular a vapor compression cycle) and comprises, in flow order for cooling, a compressor 212, a condenser 214 for rejecting heat from the refrigeration cycle, an expansion device 216 and an evaporator 218 for transferring heat from the interior 202 of the container. The expansion device may be a TXV (thermal expansion valve) or EXV (electronic expansion valve) as is known in the art. The refrigeration module 210 further comprises a controller 220, functions of which will be described in detail below. The refrigeration module 210 of the container is configured to receive power from a power supply, for example from a 12V DC power supply and/or a 110V-220 VAC power supply (i.e. optionally capable of interchangeably receiving power supplies of different types). The refrigeration cycle may be a single stage vapor compression cycle (i.e. having a single compression of a single refrigerant between evaporation and condensation). The refrigeration module 210 may be provided with a battery power supply for mobile power, for example for supplying transitional power to operate the refrigeration module 210 while the refrigerated container is being moved from a facility to a TRU or vice versa (as will be described below).

In the arrangement shown in FIG. 1, the refrigerated container 200 is disposed within the cargo space 102 such that there is no direct link between the refrigeration cycle defined by the refrigeration module 110 of the transport refrigeration unit and the refrigeration cycle defined by the refrigeration module 210 of the refrigerated container 200. The refrigeration module 210 may be coupled to a power supply provided by the TRU 100, for example a 12V DC power supply.

The container 200 and its interior 202 are disposed within the enclosed cargo space 102 in a nested arrangement, so described because there is an inner cooled space (the interior 202) disposed within an outer cooled space (the cargo space 102). Accordingly, the refrigeration cycle of the refrigeration module 110 which cools the cargo space 102 may be considered to be an "outer refrigeration cycle", whereas the refrigeration cycle of the refrigeration module 210 which cools the interior 202 of the refrigerated container 200 may be considered to be an "inner refrigeration cycle". These expressions will be used in the further disclosure as appropriate.

The nested arrangement is provided to cool the environment surrounding the container 200, so that the interior 202 of the container 200 can be maintained at a lower temperature than may otherwise be possible (e.g. if the container 200 were disposed in ambient air at, for example 10° C. to 20° C.).

This effect arises for two reasons. Firstly, in order to reject heat from the inner refrigeration cycle to the environment in the cargo space 102, the saturation temperature of the refrigerant of the inner refrigeration cycle at the condenser

214 should be higher than the temperature of the environment in the cargo space 102, so that the refrigerant condenses at the condenser and gives up its latent heat. However, there is also a requirement that the saturation temperature of the same refrigerant when at the evaporator 218 is lower than the target temperature of the interior 202.

The change in saturation temperatures is achieved by compressing the refrigerant between the evaporator and the condenser. However, there is a trend that, as the difference between the evaporator saturation temperature and the condenser saturation temperature rises, a superheat in the refrigerant discharged from the compressor rises.

Accordingly, as the difference between the temperature of a heat source (i.e. the interior 202 of the container) and the temperature of a heat sink (e.g. the environment in the cargo space 102) becomes greater, a refrigeration cycle tends to operate at a greater pressure ratio (and/or a greater absolute maximum pressure) with a higher compressor discharge temperature. Equipment complexity and cost tends to increase as any of pressure, pressure ratio, and compressor discharge temperature rise, and any of these parameters may serve as a practical limit to avoid reliability and operational issues. Moreover, with a single stage vapor compression cycle a compressor discharge temperature for selected operating conditions may be so high as to inhibit lubrication performance. For example, lubrication performance may be adversely affected when the compressor discharge temperature reaches a threshold temperature, such as 150° C.

Secondly, the rate of heat transfer into the interior 202 through walls of the container is a function of the difference between the temperature of the interior 202 and the temperature of the surrounding environment (e.g. the environment of the cargo space 102). Accordingly, the required cooling capacity of the inner refrigeration cycle increases together with an increase in the difference between the temperature of the interior 202 and the temperature of the surrounding environment. Cooling capacity may be varied by operating the inner refrigeration cycle at a greater compression ratio.

However as mentioned above, the compressor discharge temperature may apply a practical limit for some heat pump/refrigeration equipment. Accordingly, there may be a maximum cooling capacity for the inner refrigeration cycle that can be obtained for given operating conditions (e.g. temperature of the heat source/interior 202 and temperature of the heat sink/cargo space 102) while maintaining an acceptable compressor discharge temperature.

Low temperature cooling applications, for example for cooling to less than −70° C., may result in a particularly large difference between the temperature of the heat source (the interior 202) and the temperature of the heat sink and/or surrounding environment (in this example, the temperature of the environment in the cargo space 102). A suitable refrigerant for use in the inner refrigeration cycle for low temperature cooling applications may be a low temperature refrigerant having a triple point of −70° C. or less, for example a refrigerant having a saturation temperature of −70° C. at a pressure of 50 kPa. A suitable refrigerant in the inner refrigeration cycle is R-23, R-469A, R-508B, R-290 or R-170. The refrigerant may be an HFC refrigerant, an HFO refrigerant or a blend of HFC and HFO refrigerants, any of which may be an azeotropic refrigerant.

The present disclosure relates to arrangements which enable a refrigeration cycle (the inner refrigeration cycle) that cools an interior of a container to maintain low temperatures (e.g. ultra-low temperatures of −70° C. or less) without making use of very high pressure ratios in the thermal cycle, and without compressing a refrigerant so as to generate an excessively high superheat or absolute temperature at the discharge of the compressor.

The refrigeration cycle of any example container or portable refrigeration device disclosed herein may be provided by heat pump equipment (i.e. refrigeration equipment) that uses relatively moderate pressure ratios. For example, a container or portable refrigeration device as disclosed herein may comprise pressure control equipment for the associated refrigeration cycle (i.e. the inner refrigeration cycle or second stage cycle as defined elsewhere herein) that is configured so that there is a maximum compression ratio of no more than 30, for example no more than 20. The maximum compression ratio may be a limit of the compressor itself. Alternatively, it may be that this limit is imposed by a controller (e.g. a controller of the pressure control equipment) which is configured to control the inner refrigeration cycle so that the respective limit is not exceeded. As discussed above, by avoiding a high pressure ratio an excessive superheat in the compressor discharge may be avoided.

The pressure ratio may be monitored directly (e.g. using pressure sensors in the inner refrigeration cycle), or the controller may monitor other parameters such as a compressor discharge temperature. For example, there may be a temperature sensor at or downstream of the compressor and upstream of the condenser heat exchanger to monitor a compressor discharge temperature, and the controller 220 may control operation of the inner refrigeration cycle to maintain the compressor discharge temperature at or below a threshold temperature such as 150° C., or 140° C., or 135° C. Doing so may effectively limit the operating map of the inner refrigeration cycle so that for a suitable refrigerant the compression ratio is no more than 30, for example no more than 20.

FIG. 2 shows an example method 250 of operating a TRU, which will be described by way of example with reference to the TRU 100 of FIG. 1.

In block 252 the outer refrigeration cycle is operated (e.g. by the controller 120) to transfer heat from the enclosed cargo space 102 exteriorly of the enclosed cargo space 102 (e.g. to external air), to maintain a target temperature associated with the cargo space 102 of −5° C. or less, for example between −25° C. and −5° C., between −25° C. and −15° C. The target temperature may be a range or a setpoint value.

The target temperature may be a temperature of the cargo space 102, which may be monitored based on one or more temperature sensors within the cargo space 102 (e.g. taking an average of a plurality of temperature sensor readings). Alternatively, the target temperature may be a temperature of supply air (air provided to the cargo space 102 by the refrigeration module 110) or a temperature of return air (air returning to the refrigeration module 110 from the cargo space 102). Alternatively, the target temperature may be a temperature of refrigerant in the outer refrigeration cycle, for example at the evaporator 118 or downstream in the suction line to the compressor 112. The temperature may be a saturation temperature, evaluated by monitoring a pressure of the refrigerant at the evaporator 118 or within the upstream and downstream distributor and suction lines, and with reference to a predetermined relationship between pressure and temperature for a selected refrigerant. The temperature or saturation temperature of the refrigerant at the evaporator 118 may be indicative of the temperature of the air from the cargo space as it passes through the refrigeration module.

The controller 120 may receive temperature and/or pressure signals from one or more temperature sensors in the cargo space 102 and/or one or more temperature or pressure sensors in the refrigeration module 110, to monitor the respective target temperature. The controller 120 may control a setting of the expansion device (i.e. a degree of opening) and/or an operating parameter of the compressor (e.g. a duty, power, compression ratio etc.) in order to vary the cooling capacity of the outer refrigeration cycle and maintain the target temperature.

The outer refrigeration cycle may be configured to operate in a range of standard external conditions, for example in external air having a temperature of between −10° C. to 50° C.

Figure 7:
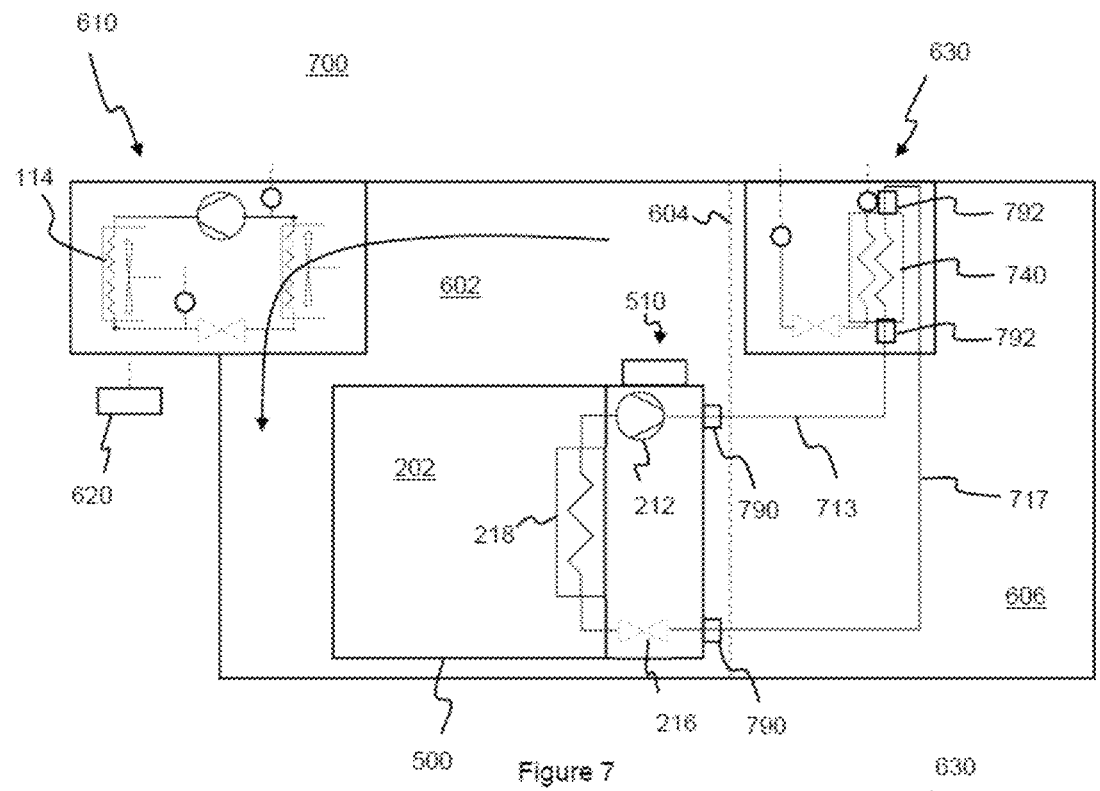
FIG. 7 and FIGS. 8*a*-8*c* are each schematic cross-sectional views of a transport refrigeration unit with a cascade refrigeration cycle for a container.

In block 254, the inner refrigeration cycle is operated (e.g. by the controller 220) to transfer heat from the interior 202 of the container 200 installed within the cargo space 102. In this example, the heat is transferred to the cargo space 102 at the condenser 214 of the inner refrigeration cycle, but in other examples it may be transferred to an alternative heat sink, as will be described with respect to further examples below (FIGS. 7 and 8).

The controller 220 may control a setting of the expansion device (i.e. a degree of opening) and/or an operating parameter of the compressor (e.g. a duty, power, compression ratio etc.) in order to vary the cooling capacity of the outer refrigeration cycle and maintain the target temperature.

In this example, the controller 220 operates the inner refrigeration cycle to maintain thermodynamic conditions of the interior 202 and/or of the inner refrigeration cycle, including:
- a target interior temperature of the container of −70° C. or less, for example between −85° C. and −70° C.; and/or
- a target evaporator saturation temperature of −70° C. or less, for example between −90° C. and −70° C.; and/or
- a target condenser saturation temperature of −25° C. or more, for example between −25° C. and −0°, such as −10° C.

It will be appreciated that saturation temperatures may be monitored for control by monitoring a pressure of a refrigerant and determining the saturation temperature based on a pre-determined relationship between pressure and saturation temperature for the selected refrigerant. Maintaining a target saturation temperature may be achieved by maintaining a target pressure of the refrigerant at the respective location.

A maximum cooling capacity (in W) of the inner refrigeration cycle while maintaining the thermodynamic conditions listed above and for a respective temperature of the heat sink (e.g. the surrounding cargo space 102) which is within the respective range recited above, may be less than a heat transfer rate through the container 200 in control conditions comprising:
- the container being disposed in air at a control temperature (e.g. 10° C.), resting on a surface at the control temperature and;
- the interior of the container being maintained at −70° C. or at a temperature corresponding to the controller maintaining the thermodynamic conditions specified above.

In other words, even if the inner refrigeration cycle were able to continue transferring heat away from the interior 202 at its maximum cooling capacity in the control conditions, it may be that the inner refrigeration cycle would not be able to sustainably maintain the low target temperature of the interior 202 when the temperature of the surrounding cargo space is higher than a threshold.

However, in nested conditions in which the cargo space 102 is being maintained at a lower temperature (e.g. between −25° C. and −5° C. as mentioned above), the heat transfer rate from the cargo space 102 into the interior 202 of the container 200 (i.e. through the walls of the container) is lower than at the control conditions. In this example this nested arrangement results in the cooling capacity of the inner refrigeration cycle, while maintaining the thermodynamic conditions described above and avoiding an excessively high compressor discharge temperature, being greater than the rate of heat transfer from the cargo space 102 into the interior 202, such that the interior 202 may be sustainably maintained at the low temperature conditions.

Example specific operating conditions of the TRU 100 are as follows:

The outer refrigeration cycle defined by the refrigeration module 110 is charged with R-452A refrigerant. The refrigeration module 110 is controlled to maintain the environment in the cargo space 102 at a target temperature of −25° C.±2° C. (i.e. a target temperature which is a range of −27° C. to −23° C. about a −25° C. setpoint). The controller 120 maintains the target temperature based on monitoring a temperature within the cargo space 102 using a temperature sensor 122 disposed within the cargo space.

The example operating conditions include the external air temperature (i.e. external to the cargo space 102) being 15° C.

The inner refrigeration cycle defined by the refrigeration module 210 is charged with R-23 refrigerant. The refrigeration module 210 is controlled to maintain the interior 202 of the container 200 at a target temperature of −80° C.±2° C. (i.e. a target temperature which is a range of −82° to −78° C. about a −80° C. setpoint).

To maintain these operating conditions, in this example the saturation temperature of the refrigerant is −86° C. at the evaporator 118, and the saturation temperature is −16° C. at the condenser 114. Based on the refrigerant being R-23, the pressure at the evaporator 118 is approximately 80 kPa and the pressure at the condenser 114 is approximately 1550 kPa. The associated temperature rise over the compressor is about 20° C.

In this example there is a compressor discharge temperature of about 10° C. The refrigeration module 210 includes a re-heating heat exchanger acting between a liquid line and a suction line of the inner refrigeration cycle, serving to temporarily remove heat from the refrigerant prior to expansion and evaporation (at the expansion device 216 and evaporator 218 respectively), and to return the heat downstream of the evaporator 218 prior to compression at the compressor 212. Accordingly, in this example the temperature of the refrigerant upon entry to the compressor 212 is higher than the temperature of the interior 202.

In this example, the re-heating heat exchanger is integrated with the evaporator heat exchanger 218. In other example, a re-heating heat exchanger may be separate from the evaporator, or there may be no re-heating heat exchanger.

FIG. 3 is a flow diagram of a method 300 of refrigerated transport, which will be described with reference to the TRU 100 and refrigerated container 200 of FIG. 1.

As mentioned above, the container 200 may be provided in the form of a portable refrigeration device removably installable in the cargo space 102 of the TRU 100.

In block 302 of the method, prior to installation in the cargo space 102, the container 200 is stored in a storage space of a supply facility. The supply facility is maintained at a target temperature of no more than −5° C., for example no more than −15° C. For example, the target temperature may be between −25° C. and −5° C., or between −25° C. and −15° C. The target temperature may be a range or may be a setpoint value.

The interior 202 of the container may be loaded with products at the supply facility, for example pharmaceutical products such as a vaccine to be maintained at low temperature.

The refrigeration module 210 of the container 200 may be coupled to a power supply of the storage facility, for example a 110-220 VAC power supply. The inner refrigeration cycle may be operated as described above with reference to block 254 of the method 250 of FIG. 2, to maintain a low temperature of the interior 202.

In block 304, the container 200 is removed from the supply facility and installed into the cargo space 102 of the TRU 100 for transport. The refrigeration module 210 of the container may be coupled to a power source for operation, such as a 12V DC power supply of the TRU.

During transport, the outer refrigeration cycle and the inner refrigeration cycle may be operated as described above with reference to the method 250 of FIG. 2 to maintain the low temperature of the interior 202.

In block 306, upon reaching a destination facility, the container 200 is removed from the cargo space 102. It may then be loaded into a storage space of the destination facility, which may be similar to that described above with respect to the supply facility. The refrigeration module 210 of the container may be coupled to a power source for operation, such as a 110-220 VAC power supply of the destination facility. Alternatively, the container 200 may be shut down or operated without being loaded into a refrigerated storage space (for example, the products may be dispensed imminently such that continued maintenance of ultra-low temperatures may not be required).

The inner refrigeration cycle may be shut down as the container transitions between a storage space and the cargo space of the TRU, or the inner refrigeration cycle may continue to operate, for example powered by a battery power supply.

A portable refrigeration device may be adapted (i.e. retrofitted) for use as described herein. By retrofitting existing equipment, supplies of refrigeration equipment for large-scale low temperature refrigerated transport initiatives may become more readily available.

FIG. 4 shows an example method of adapting a portable refrigeration device to provide a refrigerated container 200 as described above with reference to FIG. 1.

In block 402, a portable refrigeration device is provided substantially as described above albeit configured for basic chilling or freezing use (e.g. maintaining goods at chilled temperatures such as 0-10° C. or freezing goods for catering purposes, for example to −25° C.). Accordingly, the description of the refrigerated container 200 of FIG. 1 applies equally to the portable refrigeration device provided in block 402 in aspects relating to the physical configuration of the refrigeration module 210 and the refrigeration cycle, the interior 202 and the controller (except for specified setpoints and any information storage relating to low temperature refrigerants).

An example of such a portable refrigeration device is the ColdCube™ manufactured by Thermo King Corporation. Such portable refrigeration devices may conventionally be used for mobile refrigeration applications such as for catering events.

In block 404, the refrigeration cycle defined by the refrigeration module 220 is charged with a low temperature refrigerant as defined herein (i.e. a refrigerant having a triple point of −70° C. or less, and optionally a saturation temperature of −70° C. or less at a pressure of 50 kPa). For example, the refrigerant may be R-23 (also known as fluoroform, CHF3, carbon trifluoride, methyl trifluoride), or R-469A (a refrigerant mixture which is 35% carbon dioxide (R-744), 32.5% difluoromethane (R-32) and 32.5% pentafluoroethane (R-125), or R-508B (a mixture of HFC refrigerants R-23 and hexafluoroethane (R-116)), R-290 (propane), or R-170 (ethane).

In some examples, the refrigeration cycle defined by the refrigeration module 220 of the portable refrigeration device 200 may be discharged (i.e. emptied) of a refrigerant that is not a low temperature refrigerant (e.g. a refrigerant having a saturation temperature of more than −70° C. at a pressure of 50 kPA, such as R-134a, R-452A, R-404A), prior to charging the refrigeration cycle with the low temperature refrigerant. Accordingly, the refrigeration cycle may be adapted for use for low temperature cooling applications as disclosed herein.

In block 406, the controller 220 of the portable refrigeration device may be configured (e.g. reconfigured) to operate the inner refrigeration cycle to maintain one or more thermodynamic conditions as described above with reference to FIGS. 1 and 2. Accordingly, the portable refrigeration device is adapted for use for low temperature cooling applications as disclosed herein.

Figure 5:
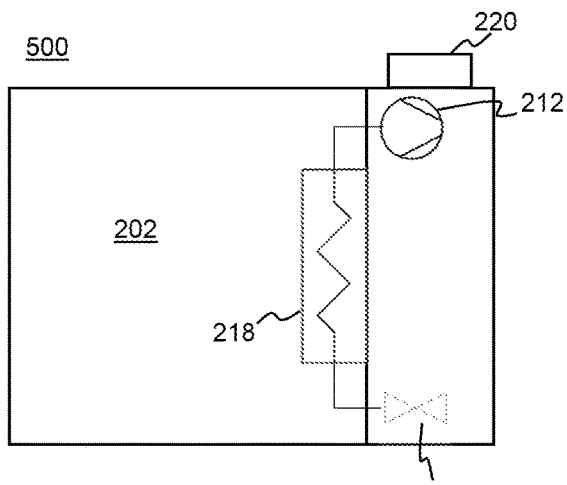
FIG. 5 is a schematic cross-sectional view of a portable refrigeration device.

FIG. 5 shows an example portable refrigeration device 500 that is substantially as described above with respect to the portable refrigeration device 200 of FIG. 1, but which differs in that there is no condenser heat exchanger for cooling operation.

Accordingly, the refrigeration cycle of the refrigeration module 210 is incomplete between the compressor 212 and the expansion device 216, and is configured for connection to separate heat exchange equipment (as will be described below) to complete the refrigeration cycle.

The portable refrigeration device 500 of FIG. 5 may be adapted from a portable refrigeration device (for example the portable refrigeration device 200 of FIG. 1) by removing the condenser heat exchanger. In this example, the portable refrigeration device 500 of FIG. 5 is provided uncharged (i.e. without refrigerant) and with open ports for connecting to separate heat exchange equipment. In a variant example, the ports of the portable refrigeration device 500 may be provided with shut-off valves for retaining a refrigerant within the incomplete refrigeration cycle, and may be provided charged with a suitable refrigerant, such as R-469A, R-23. R-508B, R-290 or R-170.

Figure 6:
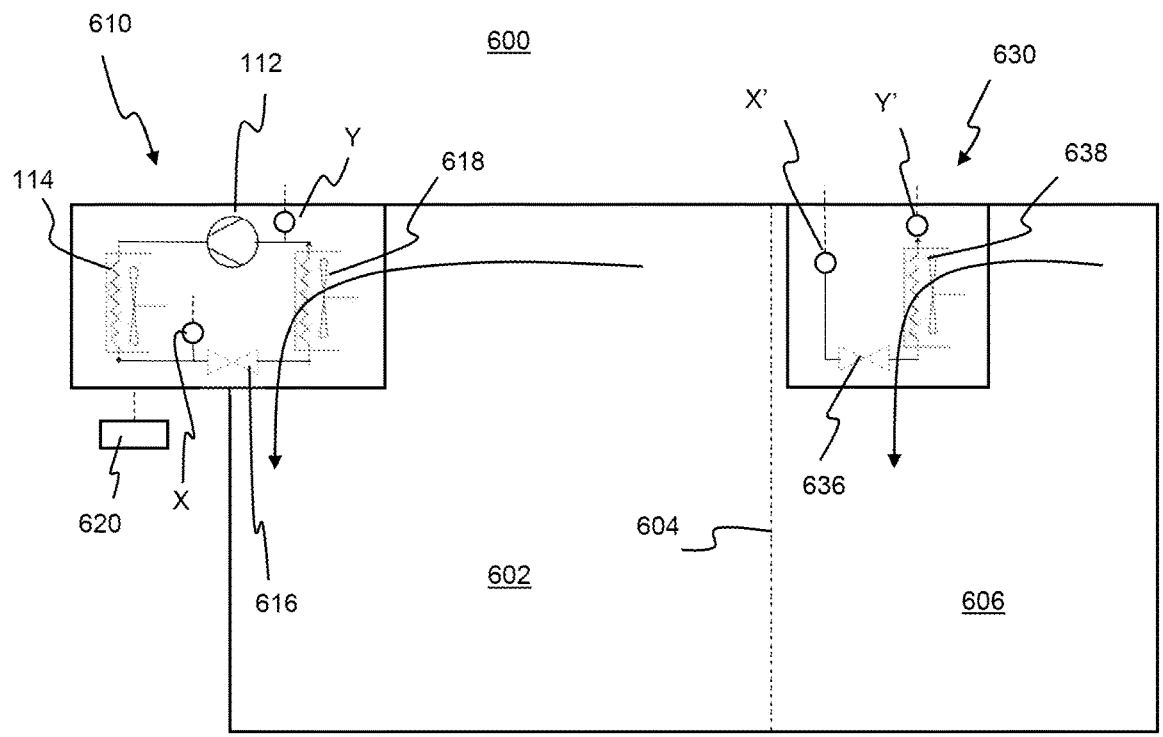
FIG. 6 is a schematic cross-sectional view of a multi-temperature transport refrigeration unit.

FIG. 6 schematically shows an example transport refrigeration unit (TRU) 600, which in this example is a multi-temperature refrigerated vehicle such as a truck. For simplicity, a chassis and cab are not shown. As above, the disclosure applies to TRUs of all types, for example trucks (e.g. box trucks), vans, trailers for use in a tractor-trailer combination (e.g. for an artic), refrigerated intermodal containers (reefers) and the like.

The TRU 600 comprises primary and secondary enclosed cargo spaces 602, 606 separated by a partition 604 and a dual-evaporator refrigeration module 610 to cool the cargo spaces 602, 606. In this example, the refrigeration module 610 comprises a primary sub-system associated with the primary cargo space 602. The primary sub-system defines a primary refrigeration cycle including, in flow order for cooling, a compressor 112, a condenser 114 for rejecting heat to external air, a primary expansion device 616 and a primary evaporator 618 for transferring heat from a controlled environment within the primary cargo space 602. In this example the compressor 112 and the evaporator 618 are co-located in the primary sub-system on either side of a gas partition (not shown) which separates the controlled environment of the primary cargo space 602 from the external environment. In this example there is a primary structural support and a primary housing which respectively support and house components of the primary sub-system, in particular the primary evaporator 618, such that the primary evaporator 618 is configured to receive and return air within the primary cargo space 602.

The refrigeration module 610 further comprises a secondary sub-system 630 including a secondary expansion device 636 and a secondary evaporator 638 for transferring heat from a controlled environment within the secondary cargo space 606. In this example, there is a secondary structural support and a secondary housing which respectively support and house components of the secondary sub-system, in particular the secondary evaporator 638, such that the secondary evaporator 638 is configured to receive and return air within the secondary cargo space 606.

In this example, in parallel with the primary refrigeration cycle, a secondary refrigeration cycle is defined between the primary sub-system and secondary sub-systems comprising, in flow order for cooling, the compressor 112, the condenser 114, the secondary expansion device 636 and the secondary evaporator 638. In other examples, the secondary evaporator 638 may not be provided with a dedicated secondary expansion device, for example there may be a common expansion device associated with both the primary and secondary evaporators 618, 638, or an alternative configuration of expansion devices.

The primary and secondary refrigeration cycles share a common condenser portion for rejecting heat to the external atmosphere and which in this example extends through the compressor 112 and the condenser 114. Downstream of the condenser 114, the primary and secondary refrigeration cycles branch off to provide parallel evaporator portions. In this example, each evaporator portion comprises the respective expansion device 616, 636 and the respective evaporator 618, 638. The expansion devices 616, 636 may be individually controlled in order to control a mass flow rate and/or pressure drop between the liquid line (which may be in common between the cycles) and the respective distributor line, to thereby control heat transfer at the respective evaporator 618, 638. As mentioned above, in other examples there may be alternative arrangements for expansion, such as a single expansion valve in common between the primary and secondary refrigeration cycles. For clarity in the drawing, refrigerant lines extending from the primary sub-system and the secondary sub-system are replaced with pairs of fluid communication systems X, X' and Y, Y' which represent refrigerant lines extending therebetween. In other examples, a dual-evaporator refrigeration module may be provided without physically separate sub-systems. For example, primary and secondary evaporators may be associated with a common support and/or a common housing of a refrigeration module, but in fluid communication with different cargo spaces on either side of a partition.

The refrigeration module 610 further comprises a controller 620, functions of which will be described in further detail below.

In other examples primary and secondary evaporators may be provided in series with one another in a single refrigeration cycle, an example of which will be described below with reference to FIG. 8c.

As shown in FIG. 7, the example portable refrigeration device 500 described above with respect to FIG. 5 is installed within the primary cargo space 602 of a TRU 700. In this particular example, the partition 604 between the primary cargo space 602 and the secondary cargo space 606 is retained, with the secondary sub-system 630 being associated with the secondary cargo space. However, in other examples the partition may be removed.

The example TRU 700 of FIG. 7 directly corresponds to the example TRU 600 described above with respect to FIG. 6, but is adapted to replace the secondary evaporator 638 with an inter-stage heat exchanger 740 that acts between the refrigeration module 610 of the TRU 700 and the portable refrigeration device 500 as will be described below. The inter-stage heat exchanger 740 may be mounted to the structural support and/or retained within the housing associated with the original secondary evaporator 638. In other words, the refrigeration module 610 comprises a structural support and housing associated with the secondary cargo space 606, and the inter-stage heat exchanger 740 may be mounted to that structural support and/or retained in that housing.

The present disclosure refers to an evaporator (or evaporator heat exchanger) as any heat exchange device which is configured and operated in use to evaporate a refrigerant passing through it to receive heat from a heat source. It will be appreciated that an evaporator provided for use in cooling a cargo space is an air-to-refrigerant type heat exchanger (e.g. a fin-and-tube type heat exchanger). In contrast, in a cascade refrigerant cycle an inter-stage heat exchanger is provided between a first stage cycle and a second stage cycle, and which (for cooling) serves as an evaporator in the first stage cycle and as a condenser in the second stage cycle. In the present disclosure such inter-stage heat exchangers are considered to be refrigerant-to-refrigerant heat exchangers, having an evaporator side in the first stage cycle and a condenser side in the second stage cycle. An example refrigerant-to-refrigerant heat exchanger is a brazed plate heat exchanger, or a tube-to-tube heat exchanger.

In this example the portable refrigeration device 500 is installed so that the refrigeration module 510 of the portable refrigeration device 500 is directly coupled to the refrigeration module of the TRU 700 to provide a cascade refrigeration cycle. The cascade refrigeration cycle has a first stage cycle corresponding to the secondary refrigeration cycle described above and which is partly defined by the secondary sub-system 630 of the refrigeration module; and a second stage cycle corresponding to the inner refrigeration cycle of the portable refrigeration device 500.

The inter-stage heat exchanger 740 is provided to transfer heat between the first stage cycle and the second stage cycle. The inter-stage heat exchanger 740 is configured to act as a condenser in the second stage cycle to reject heat from the second stage cycle, and to act as an evaporator in the first stage cycle to receive heat from the second stage cycle, which is then to be rejected at the condenser 114 of the TRU 700. In this example the inter-stage heat exchanger is physically located in the secondary sub-system 630 of the TRU (for example it may be located in association with a housing or support for the secondary evaporator 638), but in other examples the inter-stage heat exchanger may be located elsewhere, for example in a cargo space of the TRU or coupled to (e.g. supported by) the portable refrigeration device 500.

In this example an evaporator inlet port of the inter-stage heat exchanger 740 is coupled to a distributor line of the secondary sub-system 630 of the TRU (i.e. the distributor line of the secondary refrigeration cycle of the TRU 700 extending from the expansion device 636 of the secondary sub-system 630), and an evaporator outlet port of the inter-stage heat exchanger 740 is coupled to a suction line of the secondary sub-system 630 of the TRU (i.e. the suction line of the secondary refrigeration cycle of the TRU 700 which extends to the compressor 112).

With the portable refrigeration device 500 being installed within the cargo space 602 of the TRU 700, the refrigeration cycle of the portable refrigeration device will be referred to as an inner refrigeration cycle, whereas the primary refrigeration cycle of the refrigeration module 610 of the TRU 700—which cools the cargo space 602—will be referred to as an outer refrigeration cycle.

As noted above, in this example the inner refrigeration cycle (i.e. of the portable refrigeration device 500) is provided without a condenser, and upon installation in the TRU 700 it is coupled to the inter-stage heat exchanger 740. In particular, the compressor 212 of the inner refrigeration cycle is coupled to a condenser inlet port of the inter-stage heat exchanger 740 by providing a discharge line 713 between them, and a condenser outlet port of the inter-stage heat exchanger 740 is coupled to the expansion device 216 by providing a liquid line 717 between them. As shown in FIG. 7, the discharge line 713 and liquid line 717 extend through the partition 604, but in other examples there may be no partition.

Releasable connections with shut-off valves 790, 792 may be provided at ports of the inter-stage heat exchanger 740 and/or at the respective ports of the portable refrigeration device 500 (i.e. at a connection for the compressor 212 and at a connection for the expansion device 216). Accordingly, by closing the shut-off valves and releasing the connection, the portable refrigeration device 500 may be removed from the TRU 700 while retaining refrigerant in the components that define the inner refrigeration cycle. If the releasable connections with shut-off valves 790 are provided at ports of the portable refrigeration device, then the portable refrigeration device 500 may be removed while leaving the inter-stage heat exchanger 740 and the respective connecting discharge and liquid lines 713, 717 within the TRU 700. If the releasable connections with shut-off valves 792 are provided at the condenser ports of the inter-stage heat exchanger 740 then the portable refrigeration device 500 may be removed together with the discharge and liquid lines 713, 717 while leaving the inter-stage heat exchanger 740 installed. If the releasable connections with shut-off valves are provided at the evaporator ports of the inter-stage heat exchanger 740 then the portable refrigeration device 500 may be removed together with the inter-stage heat exchanger and the connecting discharge and liquid lines 713, 717. Shut-off valves may be provided on both sides of a connection in order to avoid escape of refrigerant.

Operation of the TRU 700 with the installed portable refrigeration device 500 will be described below after description of a variant examples shown in FIGS. 8a-8c.

Figure 8A:
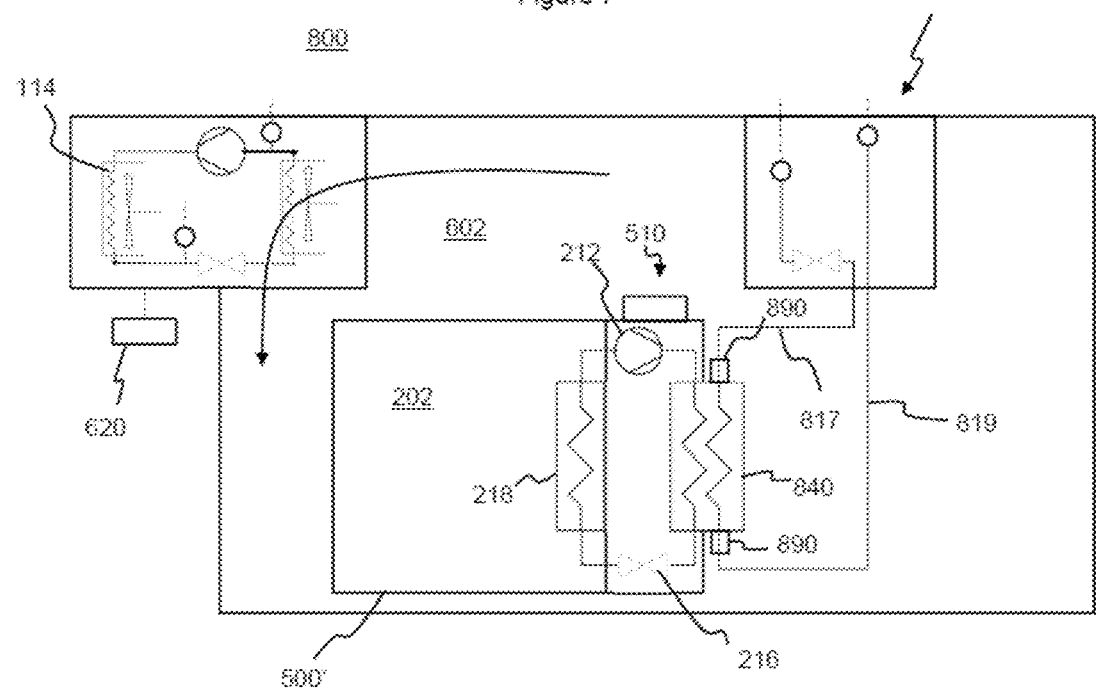

FIG. 8a shows a further example TRU 800. The example TRU 800 of FIG. 8a directly corresponds to the example TRU 600 described above with respect to FIG. 6, but is adapted to replace the secondary evaporator 638 with an inter-stage heat exchanger 840 that acts between the refrigeration module of the TRU 800 and the portable refrigeration device 500' as will be described below. Additionally, the partition 604 of the TRU 600 of FIG. 6 is removed to provide a single cargo space 602.

As with the example of FIG. 7, in this example the portable refrigeration device 500' is installed so that the refrigeration module 510 of the portable refrigeration device 500' is directly coupled to the refrigeration module 610 of the TRU 800 to provide a cascade refrigeration cycle.

However, this example differs from the example of FIG. 7 in that the inter-stage heat exchanger 840 is physically located with the portable refrigeration device 500', for example it may be coupled to the portable refrigeration device so that it is supported on the portable refrigeration device 500'. It may be integrally provided with the portable refrigeration device 500'. Condenser inlet and outlet ports of the inter-stage heat exchanger 840 are coupled to discharge and liquid lines of the inner refrigeration cycle defined by the portable refrigeration device.

In this example, an evaporator inlet port of the inter-stage heat exchanger 840 is coupled to the expansion device 636 of the secondary sub-system 630 by a distributor line 817 extending between them, and an evaporator inlet port of the inter-stage heat exchanger 840 is coupled to the compressor 112 of the TRU 800 by a suction line 819 extending between them. In this example, the suction line 819 comprises a pre-installed part that is provided with the refrigeration module 610 prior to being adapted (i.e. prior to removing the evaporator 638) and which extends between the primary and secondary sub-systems of the refrigeration module 610, and an auxiliary part which is provided between the pre-installed part and the inter-stage heat exchanger.

As described above with respect to the example of FIG. 7, releasable connections with shut-off valves 890 may be provided at ports of the inter-stage heat exchanger 840 and/or at the respective ports of the refrigeration module 610 of the TRU (i.e. at a connection for the expansion device 636 and at a connection for the compressor 112, which may be a connection between the pre-installed part of the suction line and the auxiliary part of the suction line).

Figure 8B:
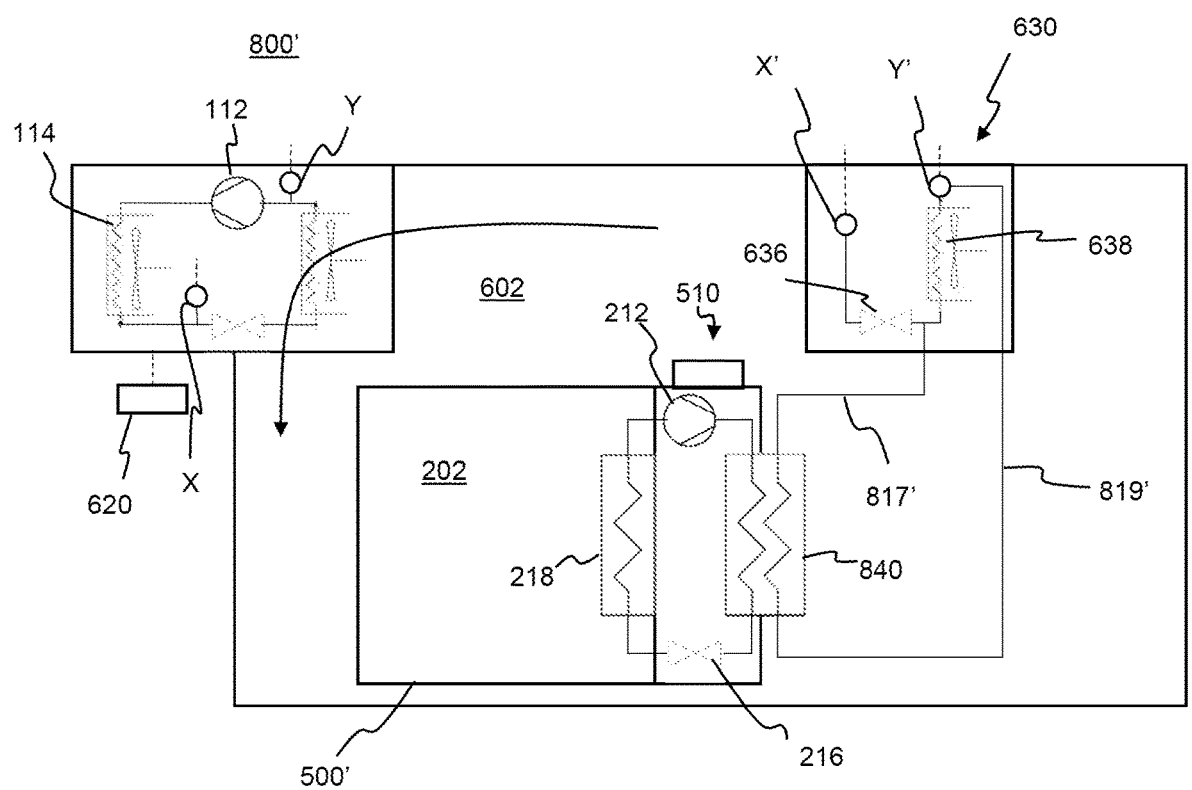

FIG. 8b shows a further example TRU 800'. The example TRU 800' of FIG. 8b differs from the example TRU 800 of FIG. 8a in that the original secondary evaporator 638 is retained (rather than removed) and bypassed. In particular, a bypass distributor line 817' extends to the evaporator inlet port of the inter-stage heat exchanger 840 from a junction in a distributor line between the expansion device 636 and the secondary evaporator 638 (i.e. upstream of the secondary evaporator). Further, a bypass suction line 819' extends from the evaporator outlet port of the inter-stage heat exchanger to a junction in a suction line between the secondary evaporator 638 and the compressor 112 (i.e. downstream of the secondary evaporator).

Valves may be provided (e.g. at the respective junctions) to by-pass the secondary evaporator heat exchanger 638 so that refrigerant can selectively flow either to the secondary evaporator heat exchanger 638 and not to the inter-stage heat exchanger 840, or to the inter-stage heat exchanger 840 and not to the secondary evaporator heat exchanger 638. A first valve or valves may be disposed upstream of the secondary evaporator heat exchanger 638 between the respective expansion device 636 and the secondary evaporator heat exchanger 638. A second valve or valves may be disposed downstream of the secondary evaporator heat exchanger 638 between the secondary evaporator heat exchanger 638 and the compressor 112. The first valve(s) and/or second valve(s) may be three-way valves.

Figure 8C:
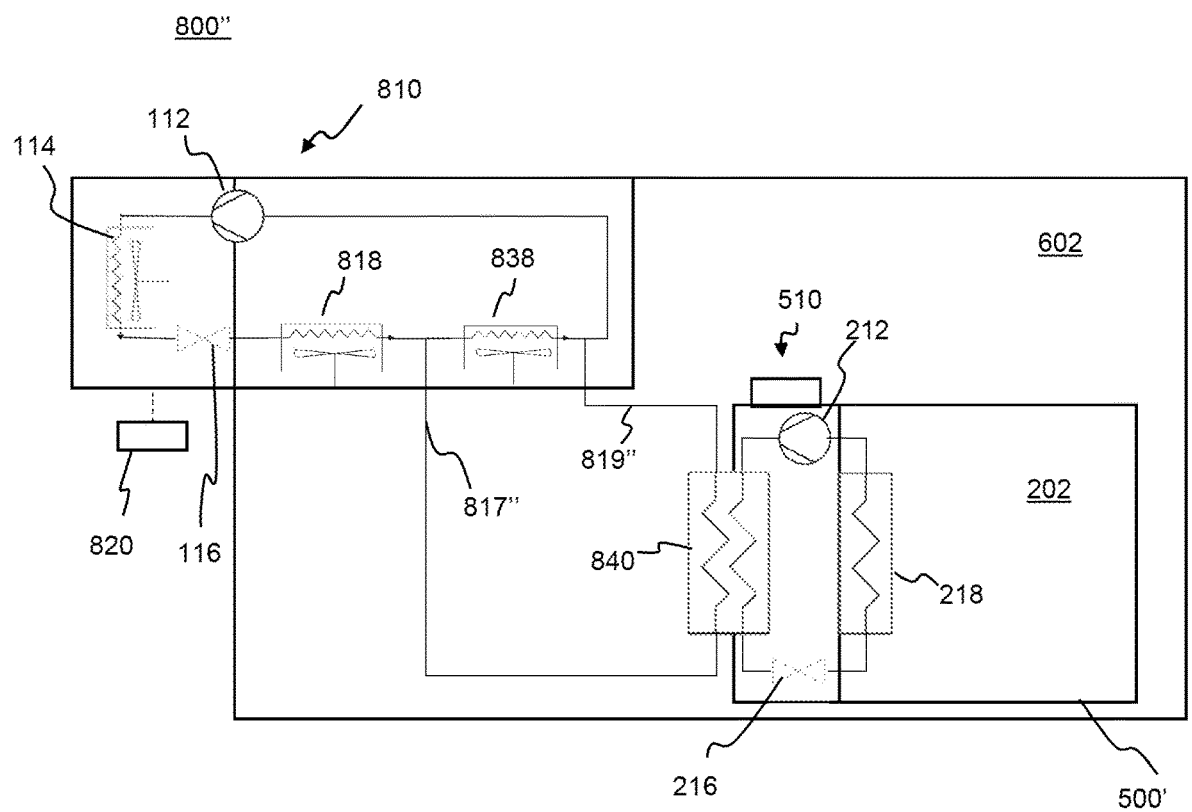

FIG. 8c shows a further example TRU 800" which differs from the TRU 800' of FIG. 8b only in that the refrigeration module 810 of the TRU is adapted from a dual-evaporator refrigeration module in which a primary evaporator 818 and a secondary evaporator 838 are provided in series relationship. In this example, the refrigeration module 810 defines an outer refrigeration cycle similar to that described above comprising, in flow series for cooling: a compressor 112, a condenser heat exchanger 114 for rejecting heat exteriorly of the TRU 800", an expansion device 116, a primary heat exchanger 818 and a secondary heat exchanger 838 in series relationship with each other. In this example, the refrigeration module 810 is adapted from a refrigeration module in which the primary and secondary evaporator heat exchangers were originally provided to cool respective enclosed cargo spaces, and it may be that the secondary refrigeration module is physically located in a secondary sub-system of the refrigeration module associated with the secondary cargo space (as described above with respect to FIGS. 6-8b). However, for simplicity, in FIG. 8c the primary and secondary heat exchangers 818, 838 are shown together.

In this example, the primary evaporator heat exchanger 818 is sized or otherwise configured to cool a primary cargo space to chilled conditions (e.g. 0-5°), whereas the secondary evaporator heat exchanger 838 is sized or otherwise configured to cool a secondary cargo space to freezing conditions (e.g. −25 to −5° C.). Such configurations may be implemented, for example, by appropriately sizing the respective evaporator heat exchangers, or by providing an intermediate expansion device between them.

A controller 820 is provided for controlling operation of the refrigeration module 810 substantially as described above with reference to the controller 620 described above with reference to FIGS. 6-8b. However, in this example the controller 820 may be configured to control a single expansion device 116 upstream of both the primary and secondary evaporator, rather than controlling separate expansion devices associated with parallel evaporators. Independent control of the thermodynamic conditions at the primary and secondary evaporators may be provided in any suitable way. For example, an intermediate expansion device may be located between the primary and secondary evaporators and controllable by the controller 820 in order to independently vary thermodynamic conditions at the primary and secondary heat exchanger.

Alternatively, one or both of the primary and secondary evaporator may be provided with a bypass and a control valve configured to determine how much flow refrigerant flows through the respective evaporator. Other suitable means of variable control may be provided, for example by varying a speed of a fan associated with an evaporator.

As with the example of FIG. 8b, in this example the secondary evaporator heat exchanger 838 is retained and bypassed to direct refrigerant to the inter-stage heat exchanger 840, such that the outer refrigeration cycle comprises a first stage cycle of a cascade refrigeration cycle defined between the refrigeration module 810 of the TRU 800" and the refrigeration module 510 of the portable refrigeration device 500'.

In this particular example, a bypass distributor line 817" extends to the evaporator inlet port of the inter-stage heat exchanger 840 from a junction in a distributor line to the secondary evaporator 838 (in particular in the line between the primary and secondary evaporators 818, 838, upstream of the secondary evaporator). Further, a bypass suction line 819" extends from the evaporator outlet port of the inter-stage heat exchanger to a junction in a suction line between the secondary evaporator 838 and the compressor 112 (i.e. downstream of the secondary evaporator). In this example, the inter-stage heat exchanger 840 is provided with the portable refrigeration device 500', but in other examples the inter-stage heat exchanger 840 may be provided in association with a support or housing of the refrigeration module 810 of the transport refrigeration unit (e.g. as shown in FIG. 7).

Valves may be provided (e.g. at the respective junctions) to by-pass the secondary evaporator heat exchanger 838 so that refrigerant can selectively flow either to the secondary evaporator heat exchanger 838 and not to the inter-stage heat exchanger 840, or to the inter-stage heat exchanger 840 and not to the secondary evaporator heat exchanger 838. A first valve or valves may be disposed upstream of the secondary evaporator heat exchanger 838 between the primary and secondary evaporators 818, 838. A second valve or valves may be disposed downstream of the secondary evaporator heat exchanger 838 between the secondary evaporator heat exchanger 838 and the compressor 112. The first valve(s) and/or second valve(s) may be three-way valves.

In yet further examples and variants of the above examples, an inter-stage heat exchanger for a cascade refrigeration cycle may be provided in series or parallel relationship with an evaporator heat exchanger (for cooling a cargo space) of a refrigeration module of a transport refrigeration unit, which may be a single evaporator heat exchanger of the refrigeration module for cooling a single enclosed cargo space of the transport refrigeration unit. For example, an inter-stage heat exchanger may be added in series or parallel relationship with the evaporator heat exchanger 118 of the example TRU 100 of FIG. 1, and coupled to the portable refrigeration device 500 as described above with reference to FIG. 5 to provide a cascade refrigeration cycle between the refrigeration module of the TRU 100 and the portable refrigeration device 500.

Figure 9:
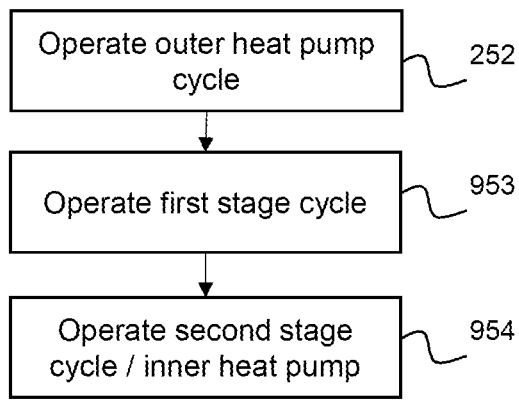
FIG. 9 is a flow diagram of a method of operating a transport refrigeration unit.

Despite physical differences between the example TRUs 700, 800 of FIGS. 7 and 8a-8c in relation to how the cascade refrigeration cycle is provided, they may be operated in substantially the same way, as will now be described with reference to the flow diagram 900 of FIG. 9.

In block 252 the outer refrigeration cycle is operated (e.g. by the controller 620, 820) substantially as described above with reference to the FIG. 2, to transfer heat from the enclosed cargo space 602 exteriorly of the enclosed cargo space 602 (e.g. to external air) to maintain a target temperature associated with the cargo space. For example, the target temperature may be 5° C. or less, for example 0-5° C. which may correspond to a target temperature for a fresh food compartment of a single-compartment or a multi-temperature refrigerated transport unit. In other examples, the target temperature may be lower, for example the target temperature may be −5° C. or less, between −25° C. and −5° C., or between −25° C. and −15° C., as described above with respect to operation of the example TRU 100 of FIG. 1. All features described above with respect to block 252 of the method of FIG. 2 apply equally to block 252 of the method of FIG. 9.

The controller 620, 820 may receive temperature signals from one or more temperature sensors in the cargo space 602 and/or the refrigeration module 610, 810 to monitor the respective target temperature.

In block 953, the first stage cycle of the cascade refrigeration cycle is operated (e.g. by the controller 620, 820) to transfer heat received from the second stage cycle at the inter-stage heat exchanger 740, 840, and to reject heat exteriorly of the enclosed cargo spaces 602, 604 and the TRU 700, 800, 800', 800".

The controller 620, 820 may control a setting of the expansion device (i.e. a degree of opening) and/or an operating parameter of the compressor (e.g. a duty, power, compression ratio etc.) in order to vary the cooling capacity of the first stage cycle and maintain the target temperature.

For example, the controller 620, 820 may operate the first stage cycle to maintain a target absolute temperature or saturation temperature of the refrigerant at the inter-stage heat exchanger or along the distributor line or suction line connected thereto. For example, the target temperature may be a target saturation temperature at the inter-stage heat exchanger of −25° C. to −5° C., for example −25° C. to −15° C. In use, the refrigerant is generally provided to the inter-stage heat exchanger at the saturation temperature, and may be discharged from the inter-stage heat exchanger at a superheat.

The controller may control the first stage cycle based on monitoring a temperature or pressure parameter associated with the refrigerant of the first stage cycle at the inter-stage heat exchanger or along the distributor line or suction line connected thereto, for example by monitoring a pressure of the refrigerant downstream of the inter-stage heat exchanger and evaluating a correlation between the pressure and the saturation temperature for the respective refrigerant to determine the saturation temperature. The controller may monitor a temperature of the refrigerant in the distributor line or at an inlet to the inter-stage heat exchanger, which may correspond to the saturation temperature in normal use. The controller may be coupled to sensor equipment to determine the respective parameters, for example a pressure sensor and/or a temperature sensor located at a suitable location between the expansion device and the compressor (i.e. along the distributor line, suction line or at the inter-stage heat exchanger).

In some examples, the controller may not control the first stage cycle based on monitoring a pressure or temperature of the refrigerant, or such monitoring may be unnecessary.

For example, the first stage cycle may be operated and controlled by the expansion device 636 being a TXV (thermal expansion valve) which is configured to vary a degree to which the valve is open to maintain a target superheat in the refrigerant discharged from the evaporator (e.g. using a sensing bulb in thermal communication with refrigerant discharged from the evaporator, and coupled to a body of the TXV 636). The TXV may be configured so that so that the target superheat corresponds to target thermodynamic conditions at the inter-stage heat exchanger, in particular target thermodynamic conditions such that the refrigerant in the first stage cycle is provided to the inter-stage heat exchanger at a lower temperature than the refrigerant in the second stage cycle, such that heat is rejected from the second stage cycle into the first stage cycle.

Further, the compressor may be controlled to vary an operating parameter of the compressor in dependence on ambient conditions, for example to ensure that the first stage cycle rejects an appropriate amount of heat based for sustainable operation based on the temperature of ambient conditions. For example, the controller may be configured to vary a duty or other operating parameter of the compressor based on a predetermined relationship between the respective operating parameter and a monitored external temperature to which heat is to be rejected (e.g. at the condenser 114).

When the outer refrigeration cycle comprises the first stage cycle (i.e. with an evaporator heat exchanger for cooling the cargo space and the inter-stage heat exchanger of the cascade refrigeration cycle being in series relationship), blocks 252 and 953 relate to controlling refrigerant flow around the same refrigeration cycle.

In block 954, the inner refrigeration cycle is operated (e.g. by the controller 220) to transfer heat from the interior 202 of the container 500, 500' installed within the cargo space 602. In this example, the heat is transferred exteriorly of the cargo space 602 (i.e. to external air outside the TRU 700, 800) via the cascade refrigeration cycle. In particular, the inner refrigeration cycle serves as a second stage cycle of the refrigeration cycle. Heat is transferred from the interior 202 into the second stage heat cycle at the evaporator 218 and is transferred (rejected) from the second stage cycle at the inter-stage heat exchanger 740, 840 to the first stage cycle, which serves as a condenser in the second stage cycle. The first stage cycle receives the heat at the inter-stage heat exchanger and rejects the heat exteriorly of the cargo space at the condenser 114.

In this example, the controller 220 operates the inner refrigeration cycle to maintain thermodynamic conditions of the interior 202 and/or of the inner refrigeration cycle substantially as described above with reference to block 254 of FIG. 2. All features relating to functions of the controller 220 described above with respect to block 254 of the method of FIG. 2 apply equally to block 954 of the method of FIG. 9.

In this example, a maximum cooling capacity (in W) of the inner refrigeration cycle and/or the cascade refrigeration cycle is less than a heat transfer rate into the interior 202 at control conditions corresponding to the cargo space being uncooled, whereas the maximum cooling capacity may be greater than or equal to the heat transfer rate into the interior 202 in use when the cargo space is cooled as described above with respect to block 252.

The maximum cooling capacity of the inner refrigeration cycle referenced above is the maximum cooling capacity while maintaining the one or more thermodynamic conditions described above with reference to block 254/954, while maintaining the compressor discharge temperature below the respective threshold (e.g. below 150° C., below 140° C. or below 135° C.), and for a temperature of the heat sink of between −25° C. and −5° C. (i.e. in this example the temperature of the refrigerant of the first stage cycle within the inter-stage heat exchanger 740, 840). As mentioned above, the comparative control conditions for evaluating heat transfer into the interior when the portable refrigeration device 500, 500' is outside of a cooled cargo space are:

the portable refrigeration device 500, 500' being disposed in air at a control temperature of 10° C., resting on a surface at the control temperature; and;

the interior of the container being maintain at −70° C. or at a temperature corresponding to the controller maintaining the thermodynamic conditions specified above.

Accordingly, in this particular example the nested arrangement which cools the cargo space 602 around the portable refrigeration device 500, 500' has the effect of lowering the heat transfer rate into the interior 202 through the walls of the container, such that the cascade refrigeration cycle can sustainably maintain the interior 202 at the target temperature. In contrast if the portable refrigeration device 500 were disposed in a warmer environment this may not be possible. The nested arrangement may permit the use or adaption of a portable refrigeration device (or refrigeration equipment for use with a container) that would not otherwise be suitable for use in a cascade refrigeration cycle to maintain the thermodynamic conditions discussed above. For example, if disposed in a warmer environment, such equipment may be required to operate at a higher compression ratio in order to achieve a higher cooling capacity to counteract heat transfer through walls of the container, which may result in a limit of the equipment being exceeded (such as a pressure ratio rating of the refrigeration equipment, or a compressor discharge temperature).

Figure 10:
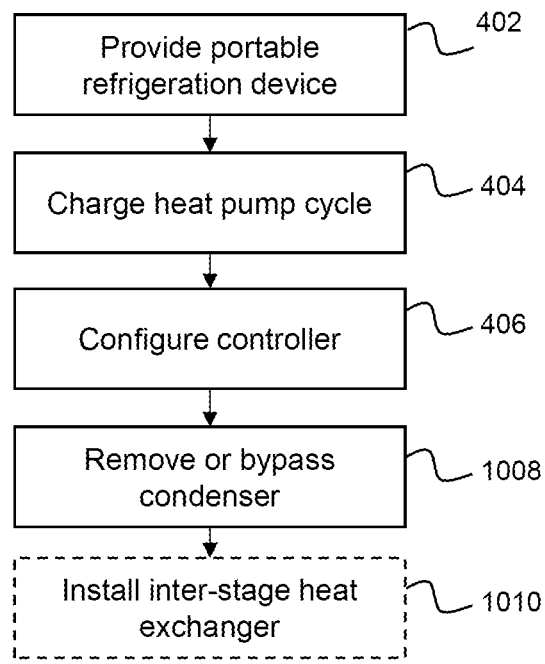
FIG. 10 is a flow diagram of a method of adapting a portable refrigeration device.

FIG. 10 is a further flow diagram of a method of adapting equipment for use in a nested cooling arrangement as described herein, and will be described by way of example with reference to the arrangements of FIGS. 7 and 8a-c.

FIG. 10 shows a method 1000 of adapting a portable refrigeration device for use in a nested cooling arrangement. The method 1000 directly corresponds to the method 400 described above with reference to FIG. 4 with respect to blocks 402, 404 and 406, and may be applied to a portable refrigeration device such as the container 200 of FIG. 1.

The method additionally comprises, in block 1008, removing or bypassing a condenser (for example the condenser 214 of the portable refrigeration device 200 of FIG. 1). This may provide a portable refrigeration device such as the device 500 described above with reference to FIGS. 5 and 7.

The adapted portable refrigeration device may be installed in a TRU such as the TRU 700 of FIG. 7, in an arrangement where it forms part of a cascade refrigeration cycle and is coupled to a separately-located inter-stage heat exchanger by discharge and suction lines that connect to the portable refrigeration device and extend from it to the inter-stage heat exchanger.

Optionally the method 1000 comprises, in block 1010, installing an inter-stage heat exchanger in place of the condenser, so that the inter-stage heat exchanger is supported by the portable refrigeration device. This may provide a portable refrigeration device such as the device 500' described above with reference to FIG. 8. The portable refrigeration device may be installed in a TRU such as the TRU 800, 800', 800" of FIGS. 8a-c, in an arrangement where it forms part of (e.g. the second stage of) a cascade refrigeration cycle, and in which distributor and suction lines of a first stage cycle extend from a refrigeration module of the TRU to evaporator ports on the inter-stage heat exchanger.

A portable refrigeration device 500, 500' as described above with reference to FIGS. 5, 7 (i.e. without an inter-stage heat exchanger) or FIGS. 8a-8c (i.e. with an integral inter-stage heat exchanger) may be provided as part of a kit for adapting a TRU having an enclosed space.

For example, the kit may include an inter-stage heat exchanger and the portable refrigeration device 500 comprising a container 200 defining an interior 202, and second stage cycle equipment which is connected to (or configured to) the inter-stage heat exchanger to define a second stage cycle of a cascade refrigeration cycle. The second stage cycle equipment may correspond to the incomplete inner refrigeration cycle of the portable refrigeration device 500 of FIG. 5, or to the inner refrigeration cycle of the portable refrigeration device 500' of FIGS. 8a-8c which is connected to the integral inter-stage heat exchanger 840.

The second stage cycle is configured to transfer heat from the interior of the container to a first stage cycle via the inter-stage heat exchanger. The kit may further comprise first stage cycle equipment for connecting a refrigeration module of a TRU to the inter-stage heat exchanger to define the first stage cycle of the refrigeration system (e.g. a first stage distributor line and a first stage suction line).

The kit may comprise any of the features described herein in relation to a container or portable refrigeration device, for example in relation to the refrigerant, the controller and its configuration to maintain particular thermodynamic conditions, and connections with other equipment (e.g. using releasable connections with shut-off valves).

In some examples, the kit may comprise a container and separate second stage cycle equipment which may be coupled to the container to provide a refrigeration cycle as described herein. In other examples, the kit may comprise a container with integrated second stage cycle equipment.

The disclosure also extends to a method of modifying a refrigeration module for a transport refrigeration unit comprising primary and secondary evaporator heat exchangers for cooling one or more enclosed cargo space. Such a method is described herein by way of example with reference to the TRU 600 of FIG. 6 (in which primary and secondary evaporators are provided in parallel) and its adaptation to provide the TRU 700 of FIG. 7, the TRU 800 of FIG. 8a and the TRU 800' of FIG. 8b. Such a method is also described herein with reference to the adaptation of a TRU having primary and secondary evaporator heat exchangers in series relationship, and its adaptation to provide the TRU 800" of FIG. 8c.

Figure 11:
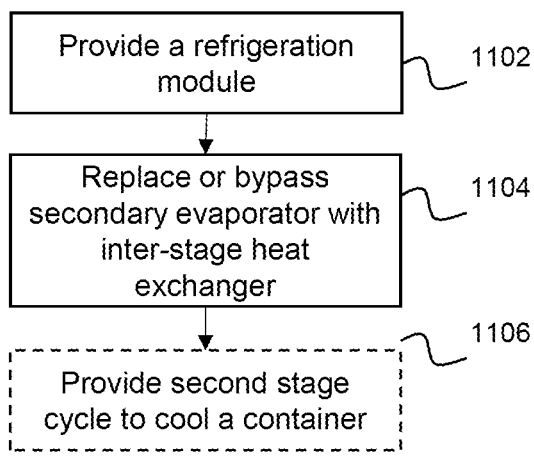
FIG. 11 is a flow diagram of a method of adapting a refrigeration module.

For completeness, steps of the methods exemplified above will now be described with reference to the flow diagram of FIG. 11. In block 1102, a refrigeration module for a transport refrigeration unit is provided, the refrigeration module comprising primary and secondary evaporator heat exchangers for cooling one or more enclosed cargo spaces. The refrigeration module may be provided as installed in a transport refrigeration unit, or may be uninstalled. In block 1104, the method comprises replacing or bypassing the secondary evaporator heat exchanger with an inter-stage heat exchanger for a cascade refrigeration cycle, so that the refrigeration unit provides a first stage cycle for a cascade refrigeration cycle. The inter-stage heat exchanger is configured to connect to second stage cycle equipment to define a second stage cycle of the cascade refrigeration cycle, the inter-stage heat exchanger comprising connections for a discharge line and a liquid line of the second stage cycle equipment. The method optionally includes, at block 1106, providing a second stage cycle of the cascade refrigeration cycle to cool a container. The second stage cycle may be provided by second stage refrigeration equipment that couples to the inter-stage heat exchanger and is configured to cool an interior of the container as described elsewhere herein. For example, a portable refrigeration device such as the portable refrigeration device 500, 500' of FIGS. 5, 7-8c may be provided, and may be coupled to the inter-stage heat exchanger to complete the cascade refrigeration cycle. The second stage cycle may be charged with a low temperature refrigerant and configured to target thermodynamic conditions associated with ultra-low temperature applications as described elsewhere herein.

For the avoidance of doubt, the disclosure extends to a method of adapting a refrigeration module itself, whether or not the refrigeration module is already installed with a cargo space to provide a transport refrigeration unit. For example, the method may be conducted on stock refrigeration modules held by an OEM, or removed from TRUs, which may then be adapted to provide adapted refrigeration modules ready to re-install.

Further, the disclosure extends to refrigeration modules which are originally manufactured (rather than adapted) to comprise primary and secondary evaporator heat exchangers as described above (e.g. whether in series or parallel relationship), wherein a primary evaporator heat exchanger is configured to cool an enclosed space (e.g. a refrigeration-to-air type heat exchanger), for example a cargo space of the transport refrigeration unit; and wherein a secondary evaporator heat exchanger is provided in the form of an inter-stage heat exchanger (e.g. a refrigerant-to-refrigerant heat exchanger) so that the refrigeration module provides a first stage cycle for a cascade refrigeration cycle. The inter-stage heat exchanger may be configured to connect to second stage cycle equipment to define a second stage cycle of the cascade refrigeration cycle, the inter-stage heat exchanger comprising connections for a discharge line and a liquid line of the second stage cycle equipment.

Unless otherwise specified, a target parameter specified for a controller (such as a target saturation temperature, target absolute temperature, target pressure etc.) may be a range of the respective parameter. For example, a controller may operate to maintain the respective parameter within the range by setting upper and lower limits associated with the range, or by setting a set-point and permitting deviation from the set-point by an amount.

The expressions "evaporator" and "condenser" are intended to have the same meaning as "evaporator heat exchanger" and "condenser heat exchanger", and may be used interchangeably herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A transport refrigeration unit comprising:
    an enclosed cargo space;
    an outer refrigeration cycle configured to transfer heat from the cargo space exteriorly of the cargo space, to cool the cargo space, the outer refrigeration cycle extending through a condenser positioned for rejecting heat to external air and an evaporator positioned for transferring heat from a controlled environment within the enclosed cargo space;
    a container installed within the cargo space;
    an inner refrigeration cycle configured to transfer heat from an interior of the container, to cool the interior of the container, the inner refrigeration cycle extending through a condenser positioned for rejecting heat from the inner refrigeration cycle and an evaporator positioned for transferring heat from the interior of the container; and
    a first stage cycle of a cascade refrigeration cycle which is configured to reject heat exteriorly of the cargo space, the first stage cycle extending through the condenser positioned for rejecting heat to external air such that said condenser is in common between the outer refrigeration cycle and the first stage cycle, wherein
    the inner refrigeration cycle forms a second stage cycle of the cascade refrigeration cycle,
    an inter-stage heat exchanger is provided between the first stage cycle and the second stage cycle.

2. The transport refrigeration unit according to claim 1, wherein:
    the outer refrigeration cycle and the first stage cycle of the cascade refrigeration cycle are in parallel relationship, and optionally extending through a common compressor; or
    the outer refrigeration cycle comprises the first stage cycle so that an evaporator heat exchanger of the outer refrigeration cycle for cooling the cargo space is in series relationship with an evaporator side of the inter-stage heat exchanger.

3. The transport refrigeration unit according to claim 1, comprising:
    releasable connections with shut-off valves between the inter-stage heat exchanger and (i) a distributor line of the first stage cycle extending to the inter-stage heat exchanger and (ii) a suction line of the first stage cycle extending from the inter-stage heat exchanger, whereby the container, the second stage cycle and the inter-stage heat exchanger are removable from the transport refrigeration unit as a portable sub-system; and/or
    releasable connections with shut-off valves between the inter-stage heat exchanger and (i) a discharge line of the second stage cycle extending to the inter-stage heat exchanger and (ii) a liquid line of the second stage cycle extending from the inter-stage heat exchanger, whereby the container and the second stage cycle are removable from the transport refrigeration unit as a portable sub-system.

4. The transport refrigeration unit according to claim 1, wherein a condenser heat exchanger of the inner refrigeration cycle is configured to reject heat exteriorly of the container into the cargo space; optionally wherein there are no refrigerant lines extending through the cargo space to the container.

5. The transport refrigeration unit according to claim 1, comprising a controller configured to operate the inner refrigeration cycle to maintain one or more thermodynamic conditions including:
    a target interior temperature of the container of $-70°$ C. or less.

6. The transport refrigeration unit according to claim 1, comprising a controller configured to operate the inner refrigeration cycle to maintain one or more thermodynamic conditions including:
    a target evaporator saturation temperature of $-70°$ C. or less.

7. A method of adapting a transport refrigeration unit and a portable refrigeration device, comprising:
    providing a transport refrigeration unit comprising a refrigeration module defining an outer refrigeration cycle configured to transfer heat from an enclosed cargo space of the transport refrigeration unit exteriorly of the cargo space to cool the cargo space, the outer refrigeration cycle extending through a condenser positioned for rejecting heat to external air and an evaporator positioned for transferring heat from a controlled environment within the enclosed cargo space; and a first stage cycle of a cascade refrigeration cycle which is configured to reject heat exteriorly of the cargo space, the first stage cycle extending through the condenser positioned for rejecting heat to external air such that said condenser is in common between the outer refrigeration cycle and the first stage cycle;
    providing a portable refrigeration device to be installed in the cargo space, the portable refrigeration device comprising:
        a container;
        an inner refrigeration cycle configured to transfer heat from an interior of the container exteriorly of the container, the inner refrigeration cycle extending through a condenser positioned for rejecting heat from the inner refrigeration cycle and an evaporator positioned for transferring heat from the interior of the container, the inner refrigeration cycle forming a second stage cycle of the cascade refrigeration cycle, with an inter-stage heat exchanger provided between the first stage cycle and the second stage cycle;

charging the portable refrigeration device with a low temperature refrigerant having a triple point at −70° or less;

configuring a controller of the portable refrigeration device to operate the inner refrigeration cycle to maintain one or more thermodynamic conditions including a target interior temperature of the container of −70° C. or less;

installing the portable refrigeration device in the cargo space of the transport refrigeration unit.

8. The method according to claim 7, further comprising discharging from the inner pump cycle a refrigerant having a saturation temperature of more than −70° C. at a pressure of 50 kPA, prior to charging the inner refrigeration cycle with the low temperature refrigerant.

9. The method according to claim 7, further comprising:

removing a condenser heat exchanger of the portable refrigeration device configured to discharge heat exteriorly of the container;

replacing or bypassing the condenser heat exchanger with an inter-stage heat exchanger connected to or configured to connect to a distributor line and a suction line of a first stage cycle of a cascade refrigeration cycle, such that the inner refrigeration cycle is configured to operate as a second stage cycle of the cascade refrigeration cycle which rejects heat to the first stage cycle at the inter-stage heat exchanger.

10. The method according to claim 7, wherein the refrigeration module as provided comprises primary and secondary evaporator heat exchangers for cooling the cargo space or respective cargo spaces, the method further comprising:

providing a first stage cycle in the refrigeration module of the transport refrigeration unit and coupling it to the inner heat pump cycle of the portable refrigeration device to provide a cascade refrigeration cycle with an inter-stage heat exchanger therebetween; and replacing the secondary evaporator heat exchanger with the inter-stage heat exchanger to provide the first stage cycle; or providing the inter-stage heat exchanger to by-pass the secondary evaporator heat exchanger.

11. The method according to claim 7, wherein charging the portable refrigeration device includes charging with a saturation temperature of −70° C. or less at a pressure of 50 kPa.

12. The method according to claim 7, wherein configuring the controller of the portable refrigeration device to operate the inner refrigeration cycle to maintain one or more thermodynamic conditions includes a target evaporator saturation temperature of −70° C. or less.

13. A method of operating a transport refrigeration unit comprising:

operating an outer refrigeration cycle to transfer heat from an enclosed cargo space exteriorly of the enclosed cargo space, to maintain a target temperature associated with the cargo space, the outer refrigeration cycle extending through a condenser positioned for rejecting heat to external air and an evaporator positioned for transferring heat from a controlled environment within the enclosed cargo space;

operating a first stage cycle of a cascade refrigeration cycle to reject heat exteriorly of the cargo space, the first stage cycle extending through the condenser positioned for rejecting heat to external air such that said condenser is in common between the outer refrigeration cycle and the first stage cycle;

operating an inner refrigeration cycle to transfer heat from an interior of a container installed within the cargo space, the inner refrigeration cycle extending through a condenser positioned for rejecting heat from the inner refrigeration cycle and an evaporator positioned for transferring heat from the interior of the container, the inner refrigeration cycle forming a second stage cycle of the cascade refrigeration cycle, with an inter-stage heat exchanger being provided between the first stage cycle and the second stage cycle;

wherein the inner refrigeration cycle is operated to maintain thermodynamic conditions including:

a target interior temperature of the container of −70° C. or less.

14. The method according to claim 13, wherein the inner refrigeration cycle is operated to maintain thermodynamic conditions including a target evaporator saturation temperature of −70° C. or less.

* * * * *

UNITED STATES PATENT AND TRADEMARK OFFICE
CERTIFICATE OF CORRECTION

PATENT NO. : 11,965,688 B2
APPLICATION NO. : 17/646957
DATED : April 23, 2024
INVENTOR(S) : Fernandez Blanco et al.

Page 1 of 1

It is certified that error appears in the above-identified patent and that said Letters Patent is hereby corrected as shown below:

On the Title Page

Item [73], delete "THEMRO KING LLC" and insert --THERMO KING LLC--.

Signed and Sealed this
Fifth Day of August, 2025

Coke Morgan Stewart
*Acting Director of the United States Patent and Trademark Office*